US011507532B2

(12) United States Patent
Hughes et al.

(10) Patent No.: US 11,507,532 B2
(45) Date of Patent: Nov. 22, 2022

(54) AGGREGATING METRICS IN DISTRIBUTED FILE SYSTEMS

(71) Applicant: Rubrik, Inc., Palo Alto, CA (US)

(72) Inventors: Jeffrey Hughes, Seattle, WA (US); Daniel Hefenbrock, Palo Alto, CA (US); Triantaphyllos Rakitzis, Seattle, WA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 17/358,702

(22) Filed: Jun. 25, 2021

(65) Prior Publication Data

US 2021/0406215 A1    Dec. 30, 2021

Related U.S. Application Data

(60) Provisional application No. 63/045,692, filed on Jun. 29, 2020.

(51) Int. Cl.
*G06F 16/22* (2019.01)
*G06F 16/11* (2019.01)
*G06F 16/14* (2019.01)
*G06F 16/13* (2019.01)

(52) U.S. Cl.
CPC .......... *G06F 16/122* (2019.01); *G06F 16/134* (2019.01); *G06F 16/156* (2019.01); *G06F 16/2237* (2019.01)

(58) Field of Classification Search
CPC .... G06F 16/122; G06F 16/134; G06F 16/156; G06F 16/22–2237
See application file for complete search history.

(56) References Cited

U.S. PATENT DOCUMENTS

| 10,505,825 | B1* | 12/2019 | Bettaiah | G06F 16/24578 |
| 2002/0108036 | A1* | 8/2002 | Okaue | G06F 21/10 713/168 |
| 2004/0193632 | A1* | 9/2004 | McCool | G06F 16/13 |
| 2011/0072004 | A1* | 3/2011 | Pettovello | G06F 16/835 707/715 |
| 2017/0371896 | A1* | 12/2017 | Pachunoori | G06F 16/1865 |

* cited by examiner

*Primary Examiner* — Robert W Beausoliel, Jr.
*Assistant Examiner* — Nirav K Khakhar
(74) *Attorney, Agent, or Firm* — Holland & Hart LLP

(57) ABSTRACT

Embodiments are directed to managing file systems over a network. A hierarchical index may be provided based on a file system and a plurality of objects stored in the file system A token index may be generated based on the hierarchical index. Each token may be a portion of the path of the objects Metric indices may be generated based on the hierarchical index and a plurality of metrics associated with the objects such that the metrics indices include one or more rows that corresponds to a place position for a metric value. Employing the token index and the metric indices to generate query results based on the plurality of metrics associated with the objects.

20 Claims, 15 Drawing Sheets

| ID | Path | Metric_0 | ... | Metric_n-1 |
|---|---|---|---|---|
| 0 | 1-A | 64 | ... | 45321 |
| 1 | 2-A\|B | 32 | ... | 3455 |
| 2 | 2-A\|C | 88 | ... | 34222 |
| 3 | 3-A\|B\|a | 16 | ... | 3443 |
| 4 | 3-A\|B\|b | 63 | ... | 435 |
| 5 | 3-A\|B\|c | 108 | ... | 6788 |
| 6 | 3-A\|B\|D | 64 | ... | 455 |
| 7 | 3-A\|C\|d | 54 | ... | 932 |
| 8 | 3-A\|C\|e | 12 | ... | 776 |
| 9 | 3-A\|C\|f | 7 | ... | 1020 |
| 10 | 3-A\|C\|F | 34 | ... | 58765 |
| 11 | 4-A\|B\|D\|g | 25 | ... | 425 |
| 12 | 4-A\|B\|D\|h | 77 | ... | 547 |
| 13 | 4-A\|B\|D\|i | 48 | ... | 556 |
| 14 | 4-A\|C\|F\|j | 67 | ... | 3433 |
| 15 | 4-A\|C\|F\|k | 4 | ... | 455 |

*Fig. 6*

|    | 0  | 1  | 2  | 3  | 4  | 5   | 6  | 7  | 8  | 9 | 10 | 11 | 12 | 13 | 14 | 15 |
|----|----|----|----|----|----|-----|----|----|----|---|----|----|----|----|----|----|
| S0 | 0  | 0  | 0  | 0  | 1  | 0   | 0  | 0  | 0  | 1 | 0  | 1  | 1  | 0  | 1  | 0  |
| S1 | 0  | 0  | 0  | 0  | 1  | 0   | 0  | 1  | 0  | 1 | 1  | 0  | 0  | 0  | 1  | 0  |
| S2 | 0  | 0  | 0  | 0  | 1  | 1   | 0  | 1  | 1  | 1 | 0  | 0  | 1  | 0  | 0  | 1  |
| S3 | 0  | 0  | 1  | 0  | 1  | 1   | 0  | 0  | 1  | 0 | 0  | 1  | 1  | 0  | 0  | 0  |
| S4 | 0  | 0  | 1  | 1  | 1  | 0   | 0  | 1  | 0  | 0 | 0  | 1  | 0  | 1  | 0  | 0  |
| S5 | 0  | 1  | 0  | 0  | 1  | 1   | 0  | 1  | 0  | 0 | 1  | 0  | 0  | 1  | 0  | 0  |
| S6 | 1  | 0  | 1  | 0  | 0  | 1   | 1  | 0  | 0  | 0 | 0  | 0  | 1  | 0  | 1  | 0  |
| S7 | 0  | 0  | 0  | 0  | 0  | 0   | 0  | 0  | 0  | 0 | 0  | 0  | 0  | 0  | 0  | 0  |
| Value | 64 | 32 | 88 | 16 | 63 | 108 | 64 | 54 | 12 | 7 | 34 | 25 | 77 | 48 | 67 | 4  |

*Fig. 8*

|     | 0 | 1 | 2 | 3 | 4 | 5 | 6 | 7 | 8 | 9 | 10 | 11 | 12 | 13 | 14 | 15 |      |    |
| --- | - | - | - | - | - | - | - | - | - | - | -- | -- | -- | -- | -- | -- | ---- | -- |
| F   | 0 | 0 | 0 | 0 | 0 | 0 | 0 | 0 | 0 | 0 | 1  | 0  | 0  | 0  | 1  | 1  |      |    |
| S0  | 0 | 0 | 0 | 0 | 1 | 0 | 0 | 0 | 0 | 1 | 0  | 1  | 1  | 0  | 1  | 0  |      |    |
|     | 0 | 0 | 0 | 0 | 0 | 0 | 0 | 0 | 0 | 0 | 0  | 0  | 0  | 0  | 1  | 0  | 1X1  | 1  |
| F   | 0 | 0 | 0 | 0 | 0 | 0 | 0 | 0 | 0 | 0 | 1  | 0  | 0  | 0  | 1  | 1  |      |    |
| S1  | 0 | 0 | 0 | 0 | 1 | 0 | 0 | 1 | 0 | 1 | 1  | 0  | 0  | 0  | 1  | 0  |      |    |
|     | 0 | 0 | 0 | 0 | 0 | 0 | 0 | 0 | 0 | 0 | 1  | 0  | 0  | 0  | 1  | 0  | 2X2  | 4  |
| F   | 0 | 0 | 0 | 0 | 0 | 0 | 0 | 0 | 0 | 0 | 1  | 0  | 0  | 0  | 1  | 1  |      |    |
| S2  | 0 | 0 | 0 | 0 | 1 | 1 | 0 | 1 | 1 | 1 | 0  | 0  | 1  | 0  | 0  | 1  |      |    |
|     | 0 | 0 | 0 | 0 | 0 | 0 | 0 | 0 | 0 | 0 | 0  | 0  | 0  | 0  | 0  | 1  | 1X4  | 4  |
| F   | 0 | 0 | 0 | 0 | 0 | 0 | 0 | 0 | 0 | 0 | 1  | 0  | 0  | 0  | 1  | 1  |      |    |
| S3  | 0 | 0 | 0 | 1 | 1 | 1 | 0 | 0 | 1 | 0 | 0  | 1  | 1  | 0  | 0  | 0  |      |    |
|     | 0 | 0 | 0 | 0 | 0 | 0 | 0 | 0 | 0 | 0 | 0  | 0  | 0  | 0  | 0  | 0  | 0X8  | 0  |
| F   | 0 | 0 | 0 | 0 | 0 | 0 | 0 | 0 | 0 | 0 | 1  | 0  | 0  | 0  | 1  | 1  |      |    |
| S4  | 0 | 0 | 1 | 1 | 1 | 0 | 0 | 1 | 0 | 0 | 0  | 1  | 0  | 1  | 0  | 0  |      |    |
|     | 0 | 0 | 0 | 0 | 0 | 0 | 0 | 0 | 0 | 0 | 0  | 0  | 0  | 0  | 0  | 0  | 0X16 | 0  |
| F   | 0 | 0 | 0 | 0 | 0 | 0 | 0 | 0 | 0 | 0 | 1  | 0  | 0  | 0  | 1  | 1  |      |    |
| S5  | 0 | 1 | 0 | 0 | 1 | 1 | 0 | 1 | 0 | 0 | 1  | 0  | 0  | 1  | 0  | 0  |      |    |
|     | 0 | 0 | 0 | 0 | 0 | 0 | 0 | 0 | 0 | 0 | 1  | 0  | 0  | 0  | 0  | 0  | 1X32 | 32 |
| F   | 0 | 0 | 0 | 0 | 0 | 0 | 0 | 0 | 0 | 0 | 1  | 0  | 0  | 0  | 1  | 1  |      |    |
| S6  | 1 | 0 | 1 | 0 | 0 | 1 | 1 | 0 | 0 | 0 | 0  | 0  | 1  | 0  | 1  | 0  |      |    |
|     | 0 | 0 | 0 | 0 | 0 | 0 | 0 | 0 | 0 | 0 | 0  | 0  | 0  | 0  | 1  | 0  | 1X64 | 64 |
| F   | 0 | 0 | 0 | 0 | 0 | 0 | 0 | 0 | 0 | 0 | 1  | 0  | 0  | 0  | 1  | 1  |      |    |
| S7  | 0 | 0 | 0 | 0 | 0 | 0 | 0 | 0 | 0 | 0 | 0  | 0  | 0  | 0  | 0  | 0  |      |    |
|     | 0 | 0 | 0 | 0 | 0 | 0 | 0 | 0 | 0 | 0 | 0  | 0  | 0  | 0  | 0  | 0  | 0X128| 0  |
|     |   |   |   |   |   |   |   |   |   |   |    |    |    |    |    |    | 105  |    |

*Fig. 10*

|   | 0 | 1 | 2 | 3 | 4 | 5 | 6 | 7 | 8 | 9 | 10 | 11 | 12 | 13 | 14 | 15 |  |  |
|---|---|---|---|---|---|---|---|---|---|---|---|---|---|---|---|---|---|---|
| B  | 0 | 1 | 0 | 1 | 1 | 1 | 1 | 0 | 0 | 0 | 0 | 1 | 1 | 1 | 0 | 0 |  |  |
| S0 | 0 | 0 | 0 | 0 | 1 | 0 | 0 | 0 | 0 | 1 | 0 | 1 | 1 | 0 | 1 | 0 |  |  |
|    | 0 | 0 | 0 | 0 | 1 | 0 | 0 | 0 | 0 | 0 | 0 | 1 | 1 | 0 | 0 | 0 | 3X1 | 3 |
| B  | 0 | 1 | 0 | 1 | 1 | 1 | 1 | 0 | 0 | 0 | 0 | 1 | 1 | 1 | 0 | 0 |  |  |
| S1 | 0 | 0 | 0 | 0 | 1 | 0 | 0 | 1 | 0 | 1 | 1 | 0 | 0 | 0 | 1 | 0 |  |  |
|    | 0 | 0 | 0 | 0 | 1 | 0 | 0 | 0 | 0 | 0 | 0 | 0 | 0 | 0 | 0 | 0 | 1X2 | 2 |
| B  | 0 | 1 | 0 | 1 | 1 | 1 | 1 | 0 | 0 | 0 | 0 | 1 | 1 | 1 | 0 | 0 |  |  |
| S2 | 0 | 0 | 0 | 0 | 1 | 1 | 0 | 1 | 1 | 1 | 0 | 0 | 1 | 0 | 0 | 1 |  |  |
|    | 0 | 0 | 0 | 0 | 1 | 1 | 0 | 0 | 0 | 0 | 0 | 0 | 1 | 0 | 0 | 0 | 3X4 | 12 |
| B  | 0 | 1 | 0 | 1 | 1 | 1 | 1 | 0 | 0 | 0 | 0 | 1 | 1 | 1 | 0 | 0 |  |  |
| S3 | 0 | 0 | 0 | 1 | 1 | 1 | 0 | 0 | 1 | 0 | 0 | 1 | 1 | 0 | 0 | 0 |  |  |
|    | 0 | 0 | 0 | 1 | 1 | 0 | 0 | 0 | 0 | 0 | 0 | 1 | 1 | 0 | 0 | 0 | 4X8 | 32 |
| B  | 0 | 1 | 0 | 1 | 1 | 1 | 1 | 0 | 0 | 0 | 0 | 1 | 1 | 1 | 0 | 0 |  |  |
| S4 | 0 | 0 | 1 | 1 | 1 | 0 | 0 | 1 | 0 | 0 | 0 | 1 | 0 | 1 | 0 | 0 |  |  |
|    | 0 | 0 | 0 | 1 | 1 | 0 | 0 | 0 | 0 | 0 | 0 | 1 | 0 | 1 | 0 | 0 | 4X16 | 64 |
| B  | 0 | 1 | 0 | 1 | 1 | 1 | 1 | 0 | 0 | 0 | 0 | 1 | 1 | 1 | 0 | 0 |  |  |
| S5 | 0 | 1 | 0 | 0 | 1 | 1 | 0 | 1 | 0 | 0 | 1 | 0 | 0 | 1 | 0 | 0 |  |  |
|    | 0 | 1 | 0 | 0 | 1 | 1 | 0 | 0 | 0 | 0 | 0 | 0 | 0 | 1 | 0 | 0 | 4X32 | 128 |
| B  | 0 | 1 | 0 | 1 | 1 | 1 | 1 | 0 | 0 | 0 | 0 | 1 | 1 | 1 | 0 | 0 |  |  |
| S6 | 1 | 0 | 1 | 0 | 0 | 1 | 1 | 0 | 0 | 0 | 0 | 0 | 1 | 0 | 1 | 0 |  |  |
|    | 0 | 0 | 0 | 0 | 0 | 1 | 1 | 0 | 0 | 0 | 0 | 0 | 1 | 0 | 0 | 0 | 3X64 | 192 |
| B  | 0 | 1 | 0 | 1 | 1 | 1 | 1 | 0 | 0 | 0 | 0 | 1 | 1 | 1 | 0 | 0 |  |  |
| S7 | 0 | 0 | 0 | 0 | 0 | 0 | 0 | 0 | 0 | 0 | 0 | 0 | 0 | 0 | 0 | 0 |  |  |
|    | 0 | 0 | 0 | 0 | 0 | 0 | 0 | 0 | 0 | 0 | 0 | 0 | 0 | 0 | 0 | 0 | 0X128 | 0 |
|    |   |   |   |   |   |   |   |   |   |   |   |   |   |   |   |   |     | 433 |

*Fig. 11*

AGGREGATING METRICS IN DISTRIBUTED FILE SYSTEMS

CROSS-REFERENCE TO RELATED APPLICATION

This application is a Utility Patent application based on previously filed U.S. Provisional Patent Application No. 63/045,692 filed on Jun. 29, 2020, the benefit of the filing date of which is hereby claimed under 35 U.S.C. § 119(e) and which is further incorporated in entirety by reference.

TECHNICAL FIELD

The present invention relates generally to data storage, and more particularly, but not exclusively, to managing data storage metrics for file systems.

SUMMARY

In some examples, a method for managing file systems over a network is provided. An example includes a network computer that performs actions, comprising: providing a hierarchical index based on a file system and a plurality of objects stored in the file system, wherein the plurality of objects are sorted based on a compound key that includes file-tree depth and a path; generating a token index based on the hierarchical index, wherein the token index includes one or more records and one or more tokens, and wherein each token is a portion of the path of the one or more objects, and wherein each record is associated with a bitmap that includes a number of bit fields based on an amount of the plurality of objects; generating one or more metric indices based on the hierarchical index and a plurality of metrics associated with the one or more objects, wherein the one or more metrics indices include one or more rows, and wherein each row of the one or more metric indices corresponds to a place position for a metric value; and in response to one or more queries, employing the token index and the one or more metric indices to generate one or more query results, wherein the one or more query results are based on the plurality of metrics associated with the one or more objects.

In some examples, generating the token index further comprises, setting one or more bit fields in the bitmap for each token based on a position of each record in the hierarchical index that includes the token, wherein setting a bit field indicates that the token is included in a corresponding record in the hierarchical index.

In some examples, providing the hierarchical index, further comprises: determining a value for each of the plurality of metrics that correspond to an object; and associating the value for each of the plurality of metrics with a record in the hierarchical index that corresponds to the object.

In some examples, generating the one or more metric indices, further comprises: associating each column of the one or more metric indices with a record in the hierarchical index; and generating a separate metric index for each metric.

In some examples, generating the one or more query results, further comprises: determining one or more query objects and one or more query metrics based on the one or more queries; determining one or more query metric indices based on the one or more query metrics, wherein one or more query place position bitmaps are determined from the one or more query metric indices; employing the token index to provide one or more location bitmaps that correspond to the one or more query objects and the one or more query metrics; generating one or more intermediate result bitmaps based on bit-wise products of the one or more query place position bitmaps and the one or more location bitmaps; generating one or more intermediate result values based on each intermediate result bitmap; and generating the one or more query results based on a sum of the one or more intermediate result values.

In some examples, a system is provided for managing file systems over a network. An example system includes: one or more network computers, comprising: a transceiver that communicates over the network; a memory that is arranged to store at least instructions; and one or more processor devices that execute instructions that perform actions, including: providing a hierarchical index based on a file system and a plurality of objects stored in the file system, wherein the plurality of objects are sorted based on a compound key that includes file-tree depth and a path; generating a token index based on the hierarchical index, wherein the token index includes one or more records and one or more tokens, and wherein each token is a portion of the path of the one or more objects, and wherein each record is associated with a bitmap that includes a number of bit fields based on an amount of the plurality of objects; generating one or more metric indices based on the hierarchical index and a plurality of metrics associated with the one or more objects, wherein the one or more metrics indices include one or more rows, and wherein each row of the one or more metric indices corresponds to a place position for a metric value; and in response to one or more queries, employing the token index and the one or more metric indices to generate one or more query results, wherein the one or more query results are based on the plurality of metrics associated with the one or more objects; and one or more client computers, comprising: a transceiver that communicates over the network; a memory that is arranged to store at least instructions; and one or more processor devices that execute instructions that perform actions, including: providing the one or more queries.

In some examples, generating the token index further comprises, setting one or more bit fields in the bitmap for each token based on a position of each record in the hierarchical index that includes the token, wherein setting a bit field indicates that the token is included in a corresponding record in the hierarchical index.

In some examples, providing the hierarchical index, further comprises: determining a value for each of the plurality of metrics that correspond to an object; and associating the value for each of the plurality of metrics with a record in the hierarchical index that corresponds to the object.

In some examples, generating the one or more metric indices, further comprises: associating each column of the one or more metric indices with a record in the hierarchical index; and generating a separate metric index for each metric.

In some examples, generating the one or more query results, further comprises: determining one or more query objects and one or more query metrics based on the one or more queries; determining one or more query metric indices based on the one or more query metrics, wherein one or more query place position bitmaps are determined from the one or more query metric indices; employing the token index to provide one or more location bitmaps that correspond to the one or more query objects and the one or more query metrics; generating one or more intermediate result bitmaps based on bit-wise products of the one or more query place position bitmaps and the one or more location bitmaps; generating one or more intermediate result values based on each intermediate result bitmap; and generating the one or more query results based on a sum of the one or more intermediate result values.

In some examples, a processor readable non-transitory storage media includes instructions for managing file systems over a network, wherein execution of the instructions by one or more processor devices performs actions comprising: providing a hierarchical index based on a file system and a plurality of objects stored in the file system, wherein the plurality of objects are sorted based on a compound key that includes file-tree depth and a path; generating a token index based on the hierarchical index, wherein the token index includes one or more records and one or more tokens, and wherein each token is a portion of the path of the one or more objects, and wherein each record is associated with a bitmap that includes a number of bit fields based on an amount of the plurality of objects; generating one or more metric indices based on the hierarchical index and a plurality of metrics associated with the one or more objects, wherein the one or more metrics indices include one or more rows, and wherein each row of the one or more metric indices corresponds to a place position for a metric value; and in response to one or more queries, employing the token index and the one or more metric indices to generate one or more query results, wherein the one or more query results are based on the plurality of metrics associated with the one or more objects.

In some examples, generating the token index further comprises, setting one or more bit fields in the bitmap for each token based on a position of each record in the hierarchical index that includes the token, wherein setting a bit field indicates that the token is included in a corresponding record in the hierarchical index.

In some examples, providing the hierarchical index, further comprises: determining a value for each of the plurality of metrics that correspond to an object; and associating the value for each of the plurality of metrics with a record in the hierarchical index that corresponds to the object.

In some examples, generating the one or more metric indices, further comprises: associating each column of the one or more metric indices with a record in the hierarchical index; and generating a separate metric index for each metric.

In some examples, generating the one or more query results, further comprises: determining one or more query objects and one or more query metrics based on the one or more queries; determining one or more query metric indices based on the one or more query metrics, wherein one or more query place position bitmaps are determined from the one or more query metric indices; employing the token index to provide one or more location bitmaps that correspond to the one or more query objects and the one or more query metrics; generating one or more intermediate result bitmaps based on bit-wise products of the one or more query place position bitmaps and the one or more location bitmaps; generating one or more intermediate result values based on each intermediate result bitmap; and generating the one or more query results based on a sum of the one or more intermediate result values.

In some examples, a network computer for managing file systems over a network is provided. An example network computer comprises: a transceiver that communicates over the network; a memory that is arranged to store at least instructions; and one or more processor devices that execute instructions that perform actions, including: providing a hierarchical index based on a file system and a plurality of objects stored in the file system, wherein the plurality of objects are sorted based on a compound key that includes file-tree depth and a path; generating a token index based on the hierarchical index, wherein the token index includes one or more records and one or more tokens, and wherein each token is a portion of the path of the one or more objects, and wherein each record is associated with a bitmap that includes a number of bit fields based on an amount of the plurality of objects; generating one or more metric indices based on the hierarchical index and a plurality of metrics associated with the one or more objects, wherein the one or more metrics indices include one or more rows, and wherein each row of the one or more metric indices corresponds to a place position for a metric value; and in response to one or more queries, employing the token index and the one or more metric indices to generate one or more query results, wherein the one or more query results are based on the plurality of metrics associated with the one or more objects.

In some examples, generating the token index further comprises, setting one or more bit fields in the bitmap for each token based on a position of each record in the hierarchical index that includes the token, wherein setting a bit field indicates that the token is included in a corresponding record in the hierarchical index.

In some examples, providing the hierarchical index, further comprises: determining a value for each of the plurality of metrics that correspond to an object; and associating the value for each of the plurality of metrics with a record in the hierarchical index that corresponds to the object.

In some examples, generating the one or more metric indices, further comprises: associating each column of the one or more metric indices with a record in the hierarchical index; and generating a separate metric index for each metric.

In some examples, generating the one or more query results, further comprises: determining one or more query objects and one or more query metrics based on the one or more queries; determining one or more query metric indices based on the one or more query metrics, wherein one or more query place position bitmaps are determined from the one or more query metric indices; employing the token index to provide one or more location bitmaps that correspond to the one or more query objects and the one or more query metrics; generating one or more intermediate result bitmaps based on bit-wise products of the one or more query place position bitmaps and the one or more location bitmaps; generating one or more intermediate result values based on each intermediate result bitmap; and generating the one or more query results based on a sum of the one or more intermediate result values.

BACKGROUND

The amount of data generated and retained by modern enterprises continues to increase. This explosion in data has led to larger and larger data storage systems or file systems. In some cases, these data storage systems may include so many data objects or files that providing results to queries regarding one or more characteristics of the file system or stored files may be prohibitively costly at least in terms of time, computing resources, or the like. In particular, providing information that may be based on aggregating various file metrics may disadvantageously require traversing large-scale file systems to individually visit large numbers of files stored across distributed file systems. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 6 illustrates a logical schematic of a hierarchical index for aggregating metrics in distributed file systems in accordance with one or more of the various embodiments;

FIG. 8 illustrates a logical schematic of a metric index for aggregating metrics in distributed file systems in accordance with one or more of the various embodiments;

FIG. 10 illustrates a logical schematic showing a query result showing how the sum of a metric may be generated in accordance with one or more of the various embodiments;

FIG. 11 illustrates a logical schematic showing a query result showing how the sum of a metric may be generated in accordance with one or more of the various embodiments;

DETAILED DESCRIPTION OF VARIOUS EMBODIMENTS

Figure 1:
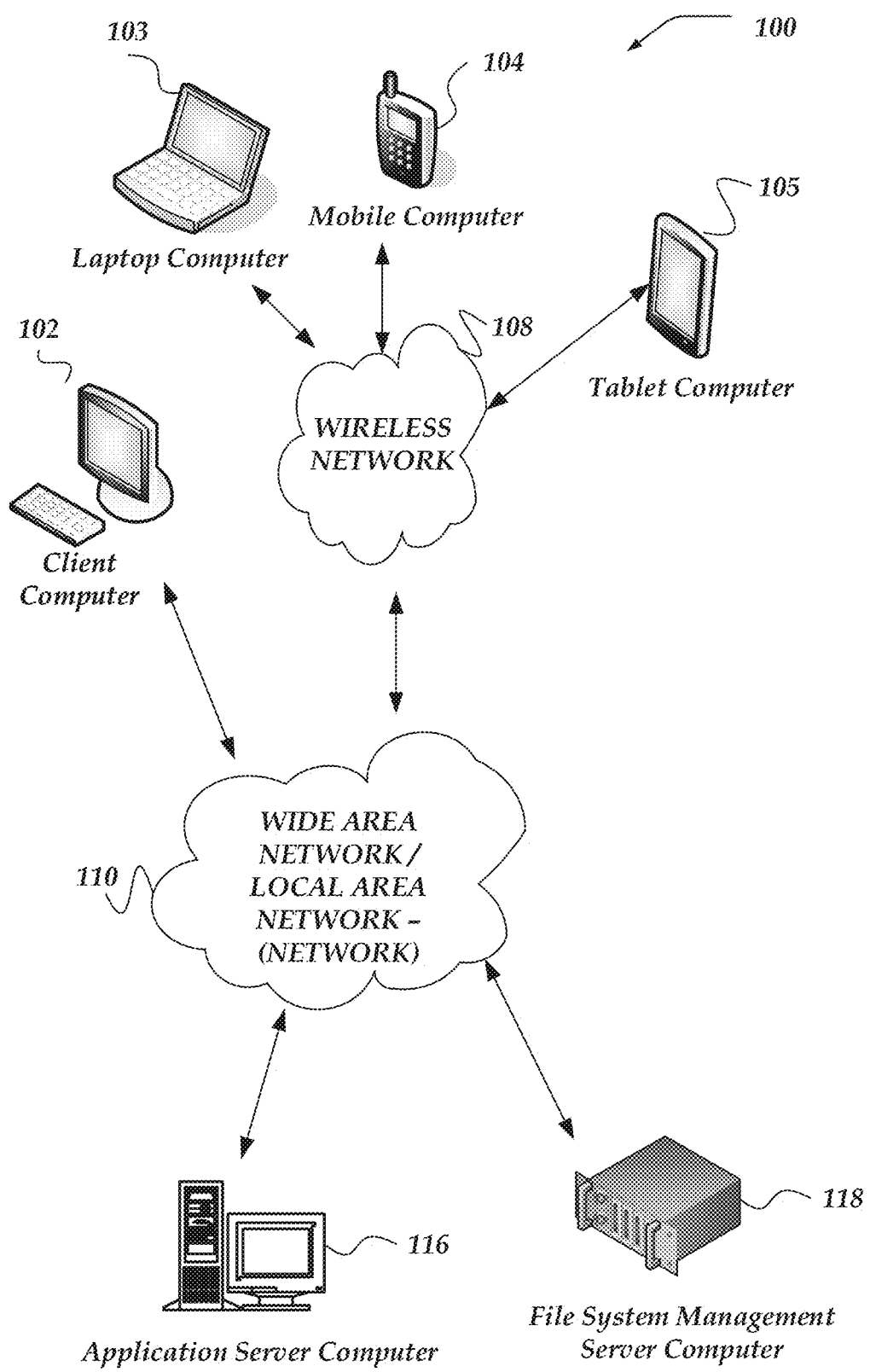
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Go, Java™, PHP, Perl, JavaScript, Ruby, Rust, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing file systems over a network. In one or more of the various embodiments, a hierarchical index may be provided based on a file system and a plurality of objects stored in the file system such that the plurality of objects may be sorted based on a compound key that includes file-tree depth and a path. In some embodiments, providing the hierarchical index may include: determining a value for each of the plurality of metrics that correspond to an object; and associating the value for each of the plurality of metrics with a record in the hierarchical index that corresponds to the object.

In one or more of the various embodiments, a token index may be generated based on the hierarchical index such that the token index includes one or more records and one or more tokens. And, in some embodiments, each token may be a portion of the path of the one or more objects such that each record may be associated with a bitmap that includes a number of bit fields based on an amount of the plurality of objects. In one or more of the various embodiments, generating the token index may include setting one or more bit fields in the bitmap for each token based on a position of each record in the hierarchical index that includes the token such that setting a bit field indicates that the token is included in a corresponding record in the hierarchical index.

In one or more of the various embodiments, one or more metric indices may be generated based on the hierarchical index and a plurality of metrics associated with the one or more objects such that the one or more metrics indices include one or more rows. And, in some embodiments, each row of the one or more metric indices corresponds to a place position for a metric value. In some embodiments, generating the one or more metric indices may include: associating each column of the one or more metric indices with a record in the hierarchical index; and generating a separate metric index for each metric.

In response to one or more queries, in some embodiments, employing the token index and the one or more metric indices to generate one or more query results such that the one or more query results may be based on the plurality of metrics associated with the one or more objects.

In one or more of the various embodiments, generating the one or more query results may include: determining one or more query objects and one or more query metrics based on the one or more queries; determining one or more query metric indices based on the one or more query metrics such that one or more query place position bitmaps may be determined from the one or more query metric indices; employing the token index to provide one or more location bitmaps that may correspond to the one or more query objects and the one or more query metrics; generating one or more intermediate result bitmaps based on bit-wise products of the one or more query place position bitmaps and the one or more location bitmaps; generating one or more intermediate result values based on each intermediate result bitmap; and generating the one or more query results based on a sum of the one or more intermediate result values.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 are described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
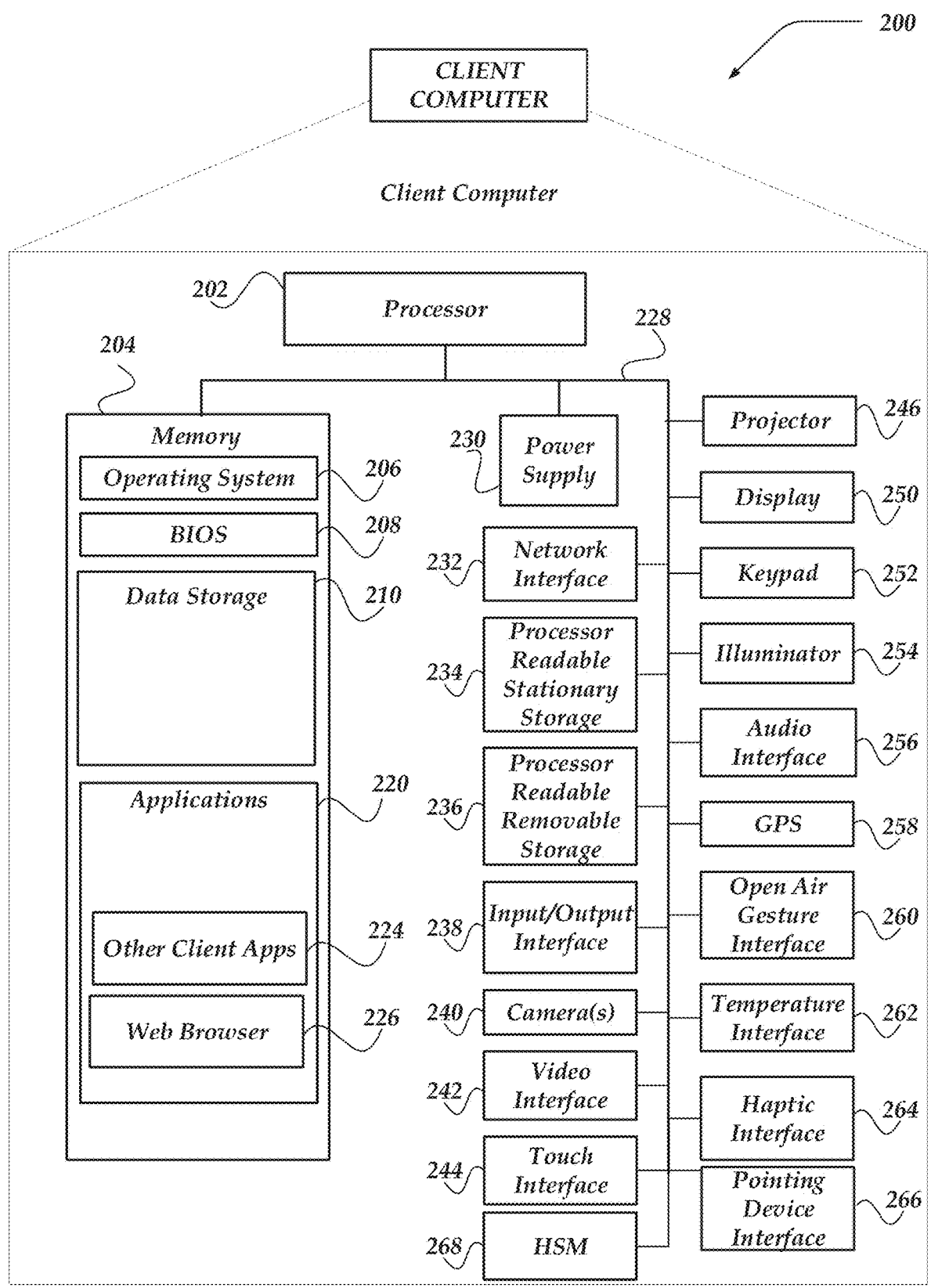
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in reports, user interfaces, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
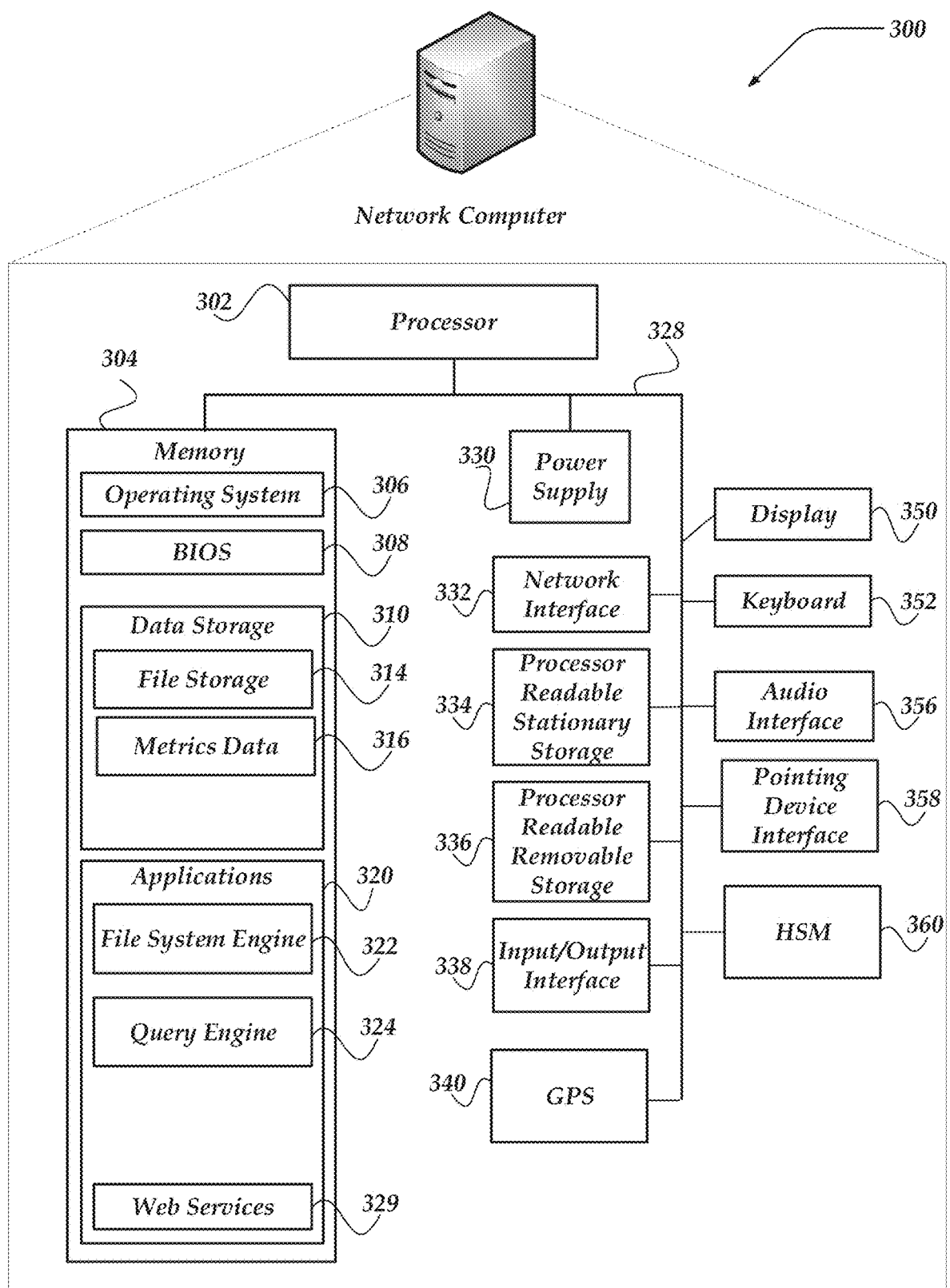
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, query engine 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or a Linux distribution, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, metrics data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, query engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, query engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, query engine 324, web services 329, or the like, may be provisioned and de-commissioned automatically.

Also, in one or more of the various embodiments, file system engine 322, query engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
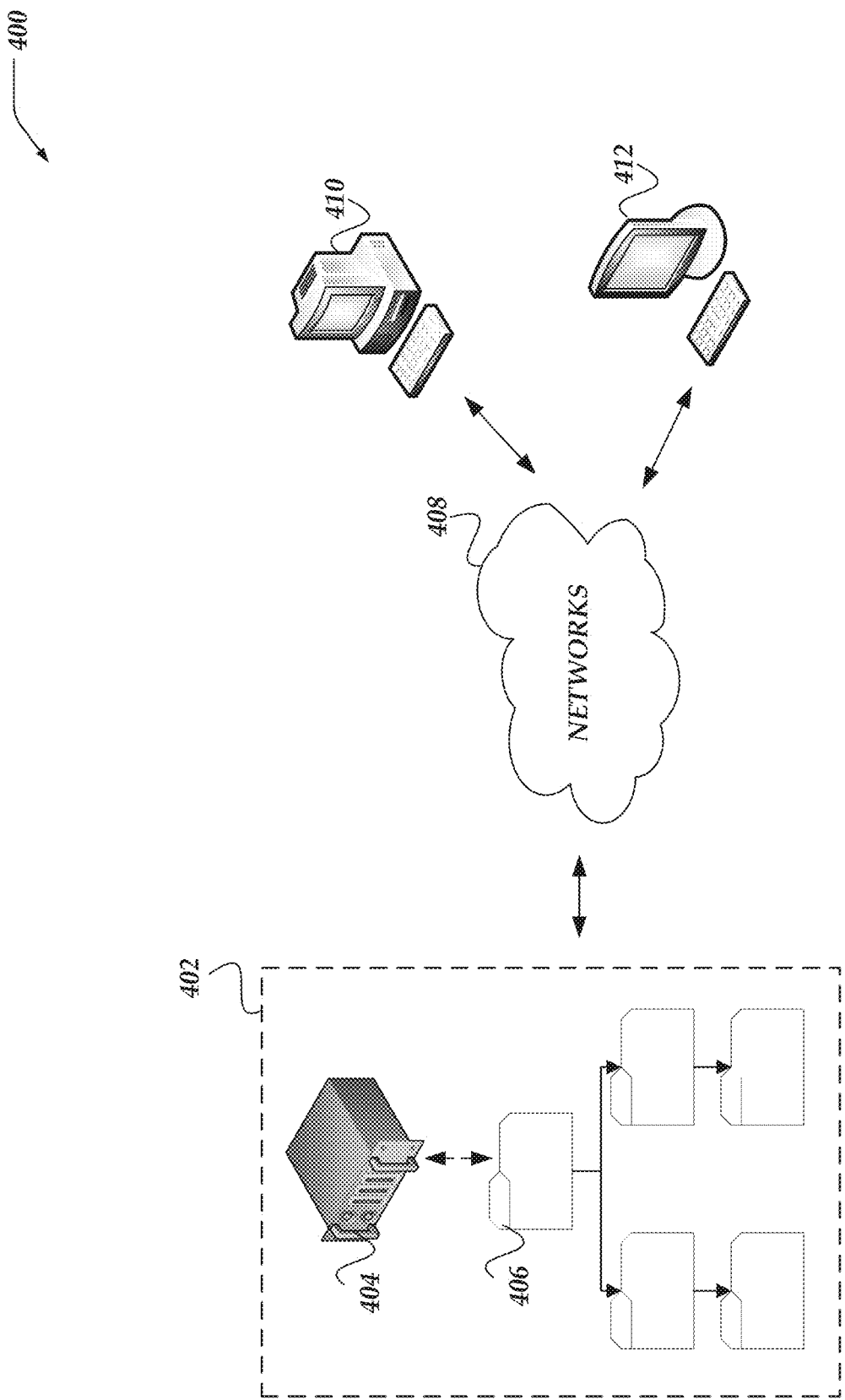
FIG. 4 illustrates a logical architecture of system for aggregating metrics in distributed file systems in accordance with one or more of the various embodiments.

FIG. 4 illustrates a logical architecture of system 400 for aggregating metrics in distributed file systems in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 and client computer 412 may be arranged to access file system 402 over networks 408. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 404, or the like. Also, in one or more of the various embodiments, file systems, such as file system 402 may include one or more file system objects, such as file system object 406. In one or more of the various embodiments, file system object 406 may represent the various objects or entities that may be stored in a file system, such as file system 402. In some embodiments, file system objects may include, blocks, files, documents, directories, folders, or the like.

Also, while file system 402 is illustrated as using one file system management computer with one set of file system objects, the innovations are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, or the like.

Figure 5:
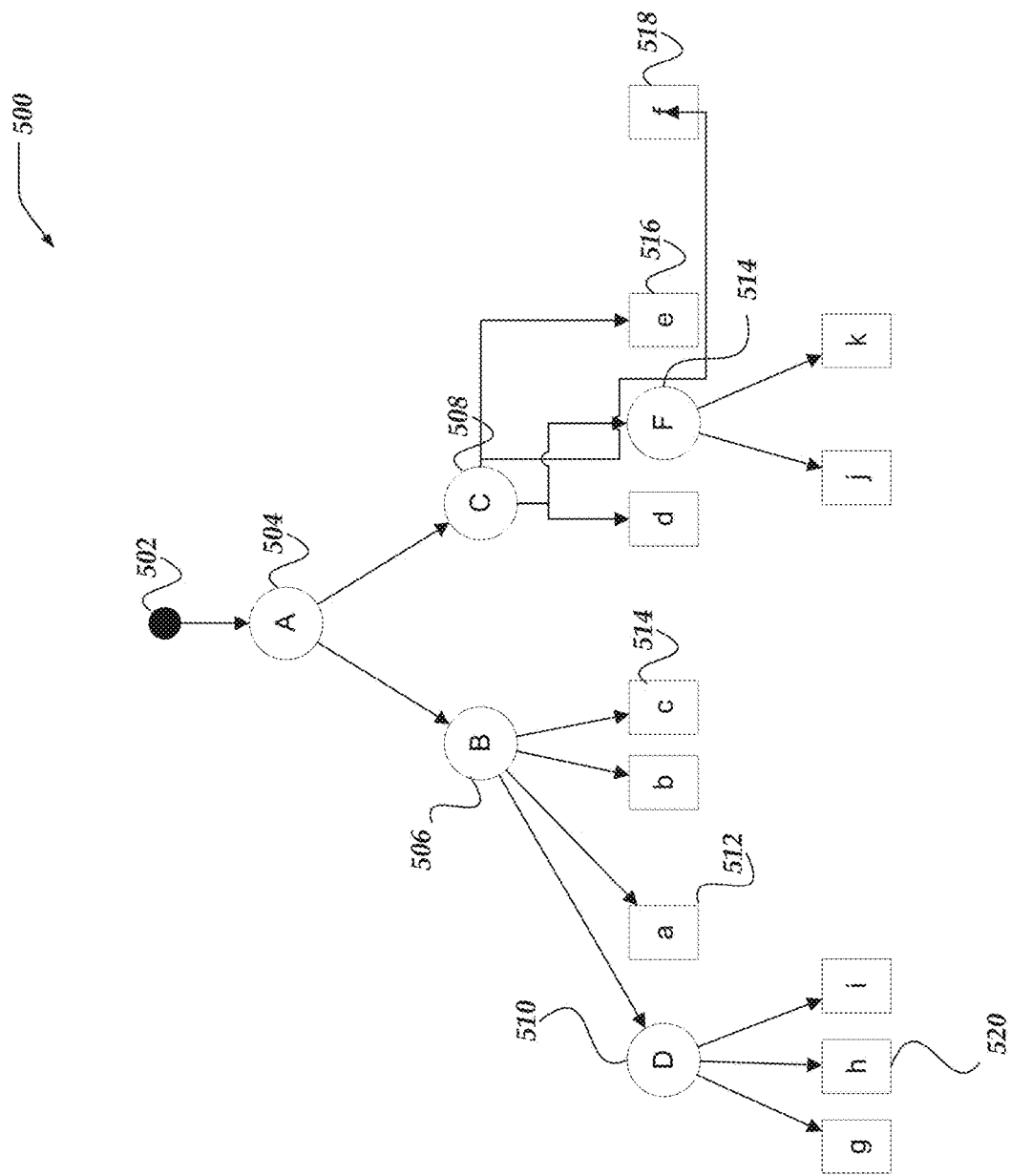
FIG. 5 illustrates a logical representation of a file system for aggregating metrics in distributed file systems in accordance with one or more of the various embodiments.

FIG. 5 illustrates a logical representation of file system 500 for aggregating metrics in distributed file systems in accordance with one or more of the various embodiments. In this example, for clarity and brevity file system 500 is represented as a tree, in practice, various data structures may be used to store the data that represents the tree-like structure of the file system. Data structures may include tabular formats that include keys, self-referencing fields, child-parent relationships, or the like, to implement tree data structures, such as, graphs, trees, or the like, for managing a file system, such as, file system 500.

In this example, circles are used to illustrate directory/folder file system objects. And, rectangles are used to represent other file system objects, such as, files, documents, or the like. The letter in the center of the file system object represents a name or identifier that may be arranged to reference, locate, or identify a given file system object. In some cases, for some embodiments, one or more file system objects identifier may be chained or concatenated together to form path in the file system that corresponds to an individual file system object. For example, A/B/c may represent a path that identifies or otherwise corresponds to file system object 514.

In this example, for some embodiments, root 502 is the beginning of a portion of a file system. Root 502 is not a file system object per se, rather, it indicates a position in a distributed file system. Directory 504 represents the parent file system object of all the objects under root 502. Directory 504 is the parent of directory 506 and directory 508. Directory 510, file object 512, and file object 514 are children of directory 506; directory 514, file object 516, and file object 518 are direct children of directory 508; file object 520 is a direct child of directory 510; and file object 524 is a direct child of directory 514.

File system 500 may be employed herein as an example file system used to explain and disclose one or more of the innovations associated with aggregating metrics in distributed file systems. Accordingly, some of the following examples or descriptions may refer to file system 500. However, one of ordinary skill in the art will appreciate that production file systems may include different arrangements of file system objects or fewer or more file system objects than shown here in file system 500.

FIG. 6 illustrates a logical schematic of hierarchical index 600 for aggregating metrics in distributed file systems in accordance with one or more of the various embodiments. In one or more of the various embodiments, file system engines, such as, file system engine 322 may be arranged to provide or generate one or more hierarchical indices, such as, hierarchical index 600.

In one or more of the various embodiments, hierarchical indices may be arranged to include one or more records that may be associated with file system objects in a file system. In some embodiments, each record in a hierarchical index may include various attributes or metrics, here represented as columns of hierarchical index 600. In this example, for some embodiments, columns may include one or more of: column 602 to represent an identifier attribute for records in hierarchical index 600; column 604 to represent a path attribute for a file system object; column 606, for storing values for one or more metrics; one or more other columns, such as, column 608 for storing values for one or more other metrics; or the like.

In one or more of the various embodiments, identifiers, such as those stored in column 602 may correspond to record positions a hierarchical index. In this example, for brevity and clarity, the shown identifier is zero-based record position value that corresponds to the row.

Note, in some cases in this description, a particular row in hierarchical index 600 may be referenced using a reference number in the figure. For example, calling out row 610 refers to the row in hierarchical index 600 pointed to by the reference number 610. However, in some cases, for clarity and brevity, one or more records in hierarchical index 600 may be referred to using the ID value included in column 602 for a given record. Accordingly, record 3 and row 610 refer to the same line in hierarchical index 600. Likewise, calling out record 10 refers to the same line as row 612. And, for example, calling out record 12 refers to the record in hierarchical index 600 that has an ID value of 12 even though the figure omits a specific row reference marker for record 12.

In one or more of the various embodiments, path information, such as the information stored in column 604 may be the path to an individual file system object. In some embodiments, as shown in this example, a path value may be a compound value based on the level depth of the object and the path to the object. Accordingly, in some embodiments, a hierarchical index may be sorted based on level depth enabling continuous runs of sibling file system objects of a particular path.

In one or more of the various embodiments, metric values, such as the values stored in column 606 or column 608 may represent a metric value for a file system object. For example, metric values may represent one or more characteristics associated with an associated file system object, such as, file size, reference counts, or the like.

Accordingly, in this example, for some embodiments, row 610 represents the information for a record that is associated with a file system object associated with the path A/B/a. In this example, row 610 may be considered to correspond to file system object 512 shown in FIG. 5. Likewise, in this example, row 612 may be considered to represent the information for a record that is associated with a file system object associated with the path A/C/F. Accordingly, in this example, row 612 may be considered to correspond to file system object 514 shown in FIG. 5. In this example, for some embodiments, the path value at row 610 is prepended with a depth level value of 3 and the path value at row 612 is prepended with a depth level of 3 as well.

In one or more of the various embodiments, hierarchical index 600 may be arranged or sorted such that objects at the same depth level are adjacent, and sibling objects are adjacent. For example, from record 3 (e.g., row 610) through record 10 (e.g., row 612), the depth level is 3. Likewise, in this example, from record 3 through record 6 the paths that begin with A|B are adjacent and from record 7 through record 9 the paths that begin with A|C are adjacent.

Figure 7:
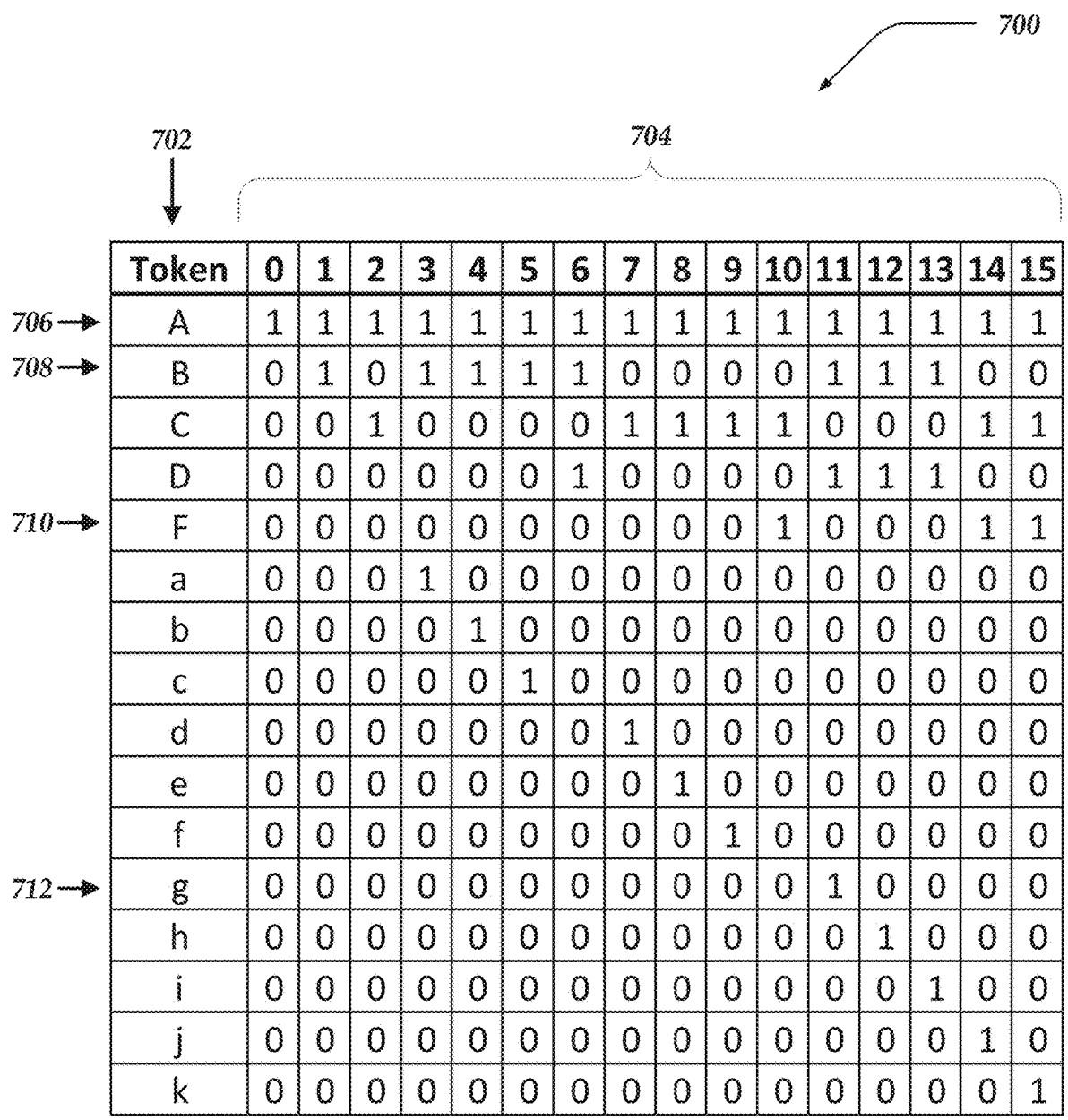
FIG. 7 illustrates a logical schematic of a token index for aggregating metrics in distributed file systems in accordance with one or more of the various embodiments.

FIG. 7 illustrates a logical schematic of token index 700 for aggregating metrics in distributed file systems in accordance with one or more of the various embodiments. In one or more of the various embodiments, file system engines, such as, file system engine 322 may be arranged to generate a token index based on a hierarchical index. In some embodiments, token indices may be arranged as inverted indices that store information for determining if a token in a file system object path may be included in a particular record of a hierarchical index.

In one or more of the various embodiments, token indices, such as, token index 700 may include various attributes, here represented as columns. In some embodiments, token indices may be arranged to include a column, such as, column 702 for storing unique token values extracted from file system object paths. Also, in some embodiments, token indices may be arranged to include columns for indicating which record of a corresponding hierarchical index includes a given token. In this example, for some embodiments, record IDs may be represented using columns 704 that may be arranged as a bitmap.

In one or more of the various embodiments, columns 704 represent a bitmap that may be arranged to include one bit field for each record in a hierarchical index. In this example, token index 700 may be considered to correspond to hierarchical index 600. Accordingly, for example, because hierarchical index 600 has sixteen records (records 0-15), columns 704 includes columns for sixteen individual bit fields.

In one or more of the various embodiments, file system engines may be arranged to set the bit fields for each token based on the hierarchical index record that a token may appear in. Accordingly, in this example, for some embodiments, row 706 includes the token value 'A' and bit fields set to represent the records in hierarchical index 600 that include the token A. Thus, in this example, because A is the root directory of file system 500, every path in file system 500 may include the token A as indicated by each bit field in row 706 being set.

Likewise, in this example, row 708 includes the token value 'B' and bit fields set to represent the records in hierarchical index 600 that include token B. Thus, in this example, token B is found in record 1, record 3, record 4, record 11, record 12, and record 13 as indicated by the corresponding bit fields being set.

Further, in this example, token F is included in just three records of hierarchical index 600. Accordingly, row 710 shows that just three bit fields are set for token F, namely, bit field 10, bit field 14, and bit field 15.

Finally, in this example, token g is included in just one record of hierarchical index 600. Accordingly, row 712 shows that just one bit field is set for token g, namely, bit field 11 representing that token g occurs just in record 11 of hierarchical index 600.

Accordingly, in one or more of the various embodiments, file system engines may be arranged to determine the number of unique file system objects based on the number of records included the hierarchical index. Accordingly, in some embodiments, file system engines may be arranged to automatically generate bitmaps for each token included in file system object paths. In some embodiments, the length of each bitmap may be determined based on the number of records in a corresponding hierarchical index. For example, in this example, hierarchical index 600 has sixteen records (record 0-15) so token index 700 may be generated to have bitmaps that have room for at least sixteen bit fields. Similarly, for example, if another file system has one million file system objects, its hierarchical index will have one million records and its corresponding token index will be generated to have bitmaps that have room for at one million bit fields.

Note, in some embodiments, file system engines may be arranged to employ one or more compression schemes or encoding schemes to optimize storage or access of the bitmaps that may comprise token indices, or the like. For example, in some embodiments, file system engines may be arranged to employ Roaring bitmaps, or the like. Accordingly, in some embodiments, file system engines may be arranged to determine bitmap compression schemes or encoding schemes based on rules, instructions, or the like, provided via configuration information. Thus, in some embodiments, organizations may employ configuration information to determine compression schemes or encoding schemes based on local circumstances, or the like.

FIG. 8 illustrates a logical schematic of metric index 800 for aggregating metrics in distributed file systems in accordance with one or more of the various embodiments. In one or more of the various embodiments, file system engines may be arranged to generate metric indices, such as, metric index 800. In some embodiments, metric indices may be comprised of one or more data structures that may be arranged to represent values of a metric associated with a file system object. For example, an example of a metric may include file/object size, or the like. Further, in one or more of the various embodiments, while one or more of the innovations disclosed herein relate to aggregating metrics associated with file system objects, other non-aggregable metrics may be represented similarly.

Accordingly, in one or more of the various embodiments, file system engines may be arranged to generate a metric index based on a hierarchical index that associates one or more metric values with individual file system objects. For example, record 0 of hierarchical index 600 shows that Metric_0 has a value of 64 and Metric_n−1 has a value of 45321 for the file system object at path A. Likewise, in hierarchical index 600, record 7 shows that Metric_0 has a value of 54 and Metric_n−1 has a value of 932.

Note, for clarity and brevity, the following description describes metric index 800 as if it was a table. Accordingly, this example is introduced using terms such as, column, row, and so on. However, in some embodiments, file system engines may be arranged to generate metric indices using light weight data structures, such as bitmaps, or the like, rather than being limited to tables.

In one or more of the various embodiments, metric indices may be arranged to include a column, such as, column 802 for representing place values or position values corresponding to a binary (base 2) representation of the value of the metric corresponding to the metric index. Also, in one or more of the various embodiments, metric index may be arranged to include columns, such as, columns 804 that may correspond to each record in a corresponding hierarchical index.

In this example, for some embodiments, metric index 800 may be considered to correspond to hierarchical index 600. Accordingly, in this example, columns 804 includes sixteen columns, one for each record in hierarchical index 600.

In one or more of the various embodiments, file system engines may be arranged to determine the number of place positions based on the range of values that need to be represented for a given metrics. For example, if metric index 800 corresponds to Metric_0 as shown in hierarchical index 600, the file system engine may be arranged to determine that all the values of Metric_0 in this example are less than 255. Thus, in this example, the range of values for Metric_0 may be represented using 8-bits or less. In contrast, (referring to hierarchical index 600) representing all the range of values for Metric_n−1 would require at least 16-bits because the largest value shown in this example is 58,765.

In some embodiments, file system engines may be arranged to establish fixed or quantized number of place positions. For example, in some embodiments, file system engines may be arranged to generate metric indices that include 8-bits, 16-bits, 32-bits, or the like, as needed rather than determining a specific number of bits based on the current maximum value of a metric. Accordingly, in one or more of the various embodiments, file system engines may be arranged to employ instructions included in configuration information to determine an initial number of place positions for a given metric index.

Accordingly, in this example, for some embodiments, column 802 is shown as having values S0-S7 such that S0 corresponds to place position 0, S1 corresponds to place position 1, and so on up to S7 that corresponds to place position 7.

Thus, in this example, row 806 represents the zero place position of an 8-bit binary (base 2) number (2 to the power of zero). Likewise, in this example, row 808 represents the two's place position in the 8-bit binary number (2 to the power of 2), row 810 represents the 4th place position (2 to the power of 4), row 812 represents the 5th place position (2 to the power of 5), row 814 represents the sixth place position (2 to the power of 6), and row 816 represents the seventh place position in the 8-bit binary number (2 to the power of 7), and so on.

Further, in this example, row 816 is included for brevity and clarity to show the value represented by the bitmap for a particular record in a hierarchical index. One of ordinary skill in the art will appreciate that row 816 may be omitted from a metric index. Likewise, the top row of metric index 800 that includes the bit field labels (e.g., 0-15) are included to help describe how a metric index works and may be omitted from an actual metric index.

In one or more of the various embodiments, file system engines may be arranged to generate metric indices based on an iteration through a hierarchical index, or the like, that associates a value of a metric with a record in the hierarchical index.

In this example, referring to hierarchical index 600 in FIG. 6, a file system engine may determine the value of Metric_0 for record 0 is 64. Likewise, file system engines may be arranged to determine that record 1 is associated with a value of 32, record 2 is associated with a value of 88, and so on.

Accordingly, in this example, the file system engine may generate metric index 800 by setting the bit fields based on a binary (base 2) representation of the metric values for each record. In this example, Metric_0 for record 0 has a value of 64. In some embodiments, this may be accomplished by setting the bit field at place position S6 corresponding to record 0, represented here by column 814.

Likewise, in this example, the metric value for hierarchical index 600 record 1 (e.g., 32) may be set in metric index 800 by setting the bit field for place position S5 (at row 810) corresponding to hierarchical index 600 record 1. Also, in this example, the metric value for record 4 (e.g., 63) may be set in metric index 800 by setting the bit fields for place positions S0, S1, S2, S3, S4, S5 that correspond to hierarchical index 600 record 4, and so on. Accordingly, as shown by this example, each value for a metric associated with a record in a hierarchical index may be represented in a metric index.

Figure 9:
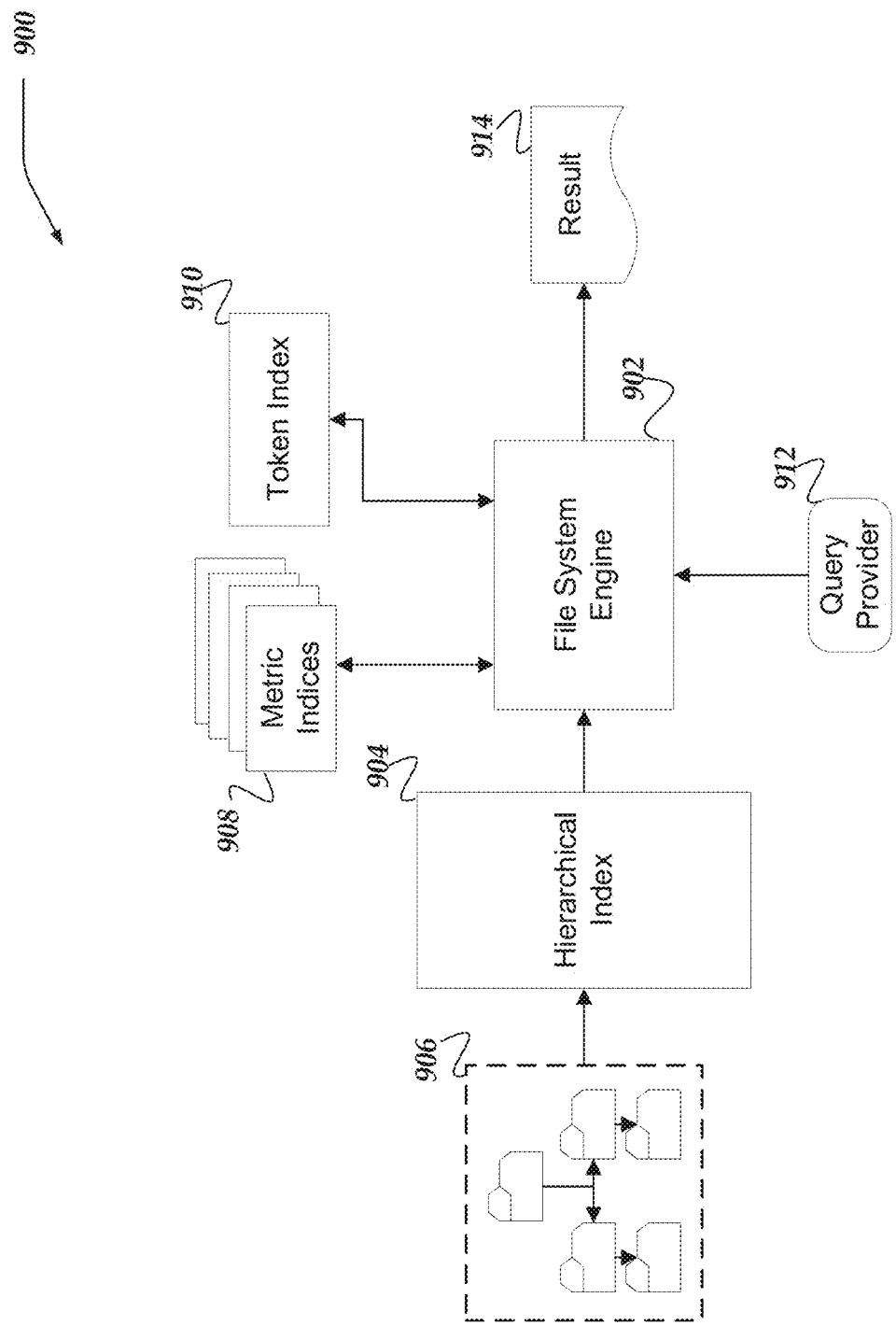
FIG. 9 illustrates a logical schematic of a system for aggregating metrics in distributed file systems in accordance with one or more of the various embodiments.

FIG. 9 illustrates a logical schematic of system 900 for aggregating metrics in distributed file systems in accordance with one or more of the various embodiments. In one or more of the various embodiments, file system engines may be arranged to support improved response to queries that may be related to aggregating metrics in distributed file systems. Accordingly, in one or more of the various embodiments, file system engines, such as, file system engine 902 may be arranged to generate or provide hierarchical indices, such as, hierarchical index 904, based on file systems, such as, file system 906. And, in one or more of the various embodiments, file system engine 902 may be arranged to employ hierarchical index 904 to generate one or more metric indices, such as, metric indices 908 and one or more token indices, such as, token index 910, or the like.

Accordingly, in one or more of the various embodiments, one or more query providers, such as, query provide 912 may be enabled to provide one or more queries regarding one or more metrics associated with file system 906. In some embodiments, query providers may include client computers, file system clients, applications, operating systems, other services, or the like.

In one or more of the various embodiments, file system engines may be arranged to employ hierarchical indices and corresponding metric indices to generate results or answer based on provided queries. In this example, query provider 912 may provide queries to file system engine 902. Accordingly, in this example, file system engine 902 may be arranged to employ metric indices 908 and token index 910 to generate query results 914 based on provided queries.

For example, for some embodiments, query provider 912 may provide a query that asks for the aggregated metric value of all file system objects associated with a one or more particular paths. For example, if a query requested the sum of Metric_0 for file system objects associated with file system object 514 (A/B/F) and its children (A/B/F/j and A/B/F/k), file system engine 902 may employ hierarchical token index 700, and metric index 800 to provide '105' as the answer.

In one or more of the various embodiments, file system engines arranged to employ metric indices and token indices to answer aggregated queries are able to provide results absent expensive scans or traversals of the associated file system. In the small file system included the provided example, the improvements or performance gains may appear to be trivial. However, in actual large scale or hyper scale applications, these innovations may enable queries that would otherwise by impractical.

FIG. 10 illustrates a logical schematic showing query result 1000 showing how the sum of a metric may be generated in accordance with one or more of the various embodiments. As described above, file system engines may employ hierarchical indices, token indices, metric indices, or the like, to aggregate metrics associated with file system objects.

This example is based on hierarchical index 600, token index 700, and metric index 800 to clarify one or more of the operations for aggregating metrics in distributed file systems. One of ordinary skill in the art will appreciate that query result 1000 is an example and that similar operations may be performed using other hierarchical indices, token indices, metric indices, or the like, to evaluate metrics associated with file system objects in file systems.

In this example, a query provider, such as, query provider 912 may provide a query that asks for the sum of Metric_0 (in hierarchical index 600) for file system object A/B/F and its child file system objects (A/B/F/j and A/B/F/k).

In this example, for some embodiments, file system engines may be arranged to compute the requested sum using the record in token index 700 that corresponds to token F (row 710 in FIG. 7) and place position bitmaps that comprise metric index 600.

In this example, bitmap 1002 shows a bitmap from token index 700 that corresponds to F. (row 710 in FIG. 7). Also, in this example, bitmap 1004 shows a bitmap that corresponds to place position S1 (row 808 in FIG. 8).

Accordingly, in one or more of the various embodiments, file system engines may be arranged to generate partial sums by executing a bitwise logical AND operation of the bitmap from the token index and the bitmap from the metric index. Next, in one or more of the various embodiments, file system engines may be arranged to conventionally count the number of non-zero bits that result. Then, in some embodiments, the number of non-zero bits may be conventionally multiplied by the place value that corresponds to the place position bitmap resulting in a partial sum.

For brevity, only a portion of the operations will be described below in detail. However, each place position (S0-S7) value may be computed similarly and summed together.

In this example, bitmap 1002 ANDed with bitmap 1004 provides an intermediate result bitmap that includes two non-zero bits. And, because, in this example, the place value corresponding to bitmap 1004 is 2, partial sum 1006 has a value of 4. E.g., 2×2=4. Note, bitmap 1002 corresponds to row 710 in token index 700 and bitmap 1004 corresponds to row 808 in metric index 800.

Similarly, in this example, bitmap 1008 ANDed with bitmap 1010 provides an intermediate result bitmap that includes one non-zero bit. And, because, in this example, the place value corresponding to bitmap 1010 is 32, partial sum 1012 has a value of 32. E.g., 1×32=32. Note, bitmap 1008 corresponds to row 710 in token index 700 and bitmap 1012 corresponds to row 812 in metric index 800.

Accordingly, in one or more of the various embodiments, file system engines may be arranged to perform the operations as described to compute partial sums, such as, partial sum 1006 and partial sum 1012, for each place position represented in a corresponding metric index.

Further, in some embodiments, if the partial sums may be generated, file system engines may be arranged to add them together to provide the total result for the aggregation query.

Thus, in this example, a query asking for the sum of Metric_0 (column 606 in hierarchical index 600) for all file system objects with F in the path will produce total sum 1014 having value of 105 absent.

FIG. 11 illustrates a logical schematic showing query result 1100 showing how the sum of a metric may be generated in accordance with one or more of the various embodiments. As described above, file system engines may employ hierarchical indices, token indices, metric indices, or the like, to aggregate metrics associated with file system objects.

This example is similar to FIG. 10 described above, in that it relies on hierarchical index 600, token index 700 and metric index 800. However, in this example, Metric_0 is being aggregated for file system objects that include B in their path rather than file system objects that include F in their path.

For brevity, only a portion of the operations will be described below in detail. However, each place position (S0-S7) value may be computed similarly and summed together.

In this example, bitmap 1102 ANDed with bitmap 1104 provides an intermediate result bitmap that includes three non-zero bits. And, because, in this example, the place value corresponding to bitmap 1104 is 1, partial sum 1106 has a value of 3. E.g., 3×1=3. Note, bitmap 1102 corresponds to row 708 in token index 700 and bitmap 1104 corresponds to row 806 in metric index 800.

Similarly, in this example, bitmap 1108 ANDed with bitmap 1110 provides an intermediate result bitmap that includes four non-zero bits. And, because, in this example, the place value corresponding to bitmap 1110 is 16, partial sum 1112 has a value of 64. E.g., 4×16=64. Note, bitmap 1108 corresponds to row 708 in token index 700 and bitmap 1112 corresponds to row 810 in metric index 800.

Thus, in this example, a query asking for the sum of Metric_0 (column 606 in hierarchical index 600) for all file system objects with B in the path will produce total sum 1114 having value of 433.

Generalized Operations

FIGS. 12-15 represent generalized operations for aggregating metrics in distributed file systems in accordance with one or more of the various embodiments. In one or more of the various embodiments, processes 1200, 1300, 1400, and 1500 described in conjunction with FIGS. 12-15 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 12-15 may perform one or more actions for aggregating metrics in distributed file systems in accordance with at least one of the various embodiments or architectures such as those described in conjunction with FIGS. 4-11. Further, in one or more of the various embodiments, some or all of the actions performed by processes 1200, 1300, 1400, or 1500 may be executed in part by file system engine 322, query engine 324, or the like.

Figure 12:
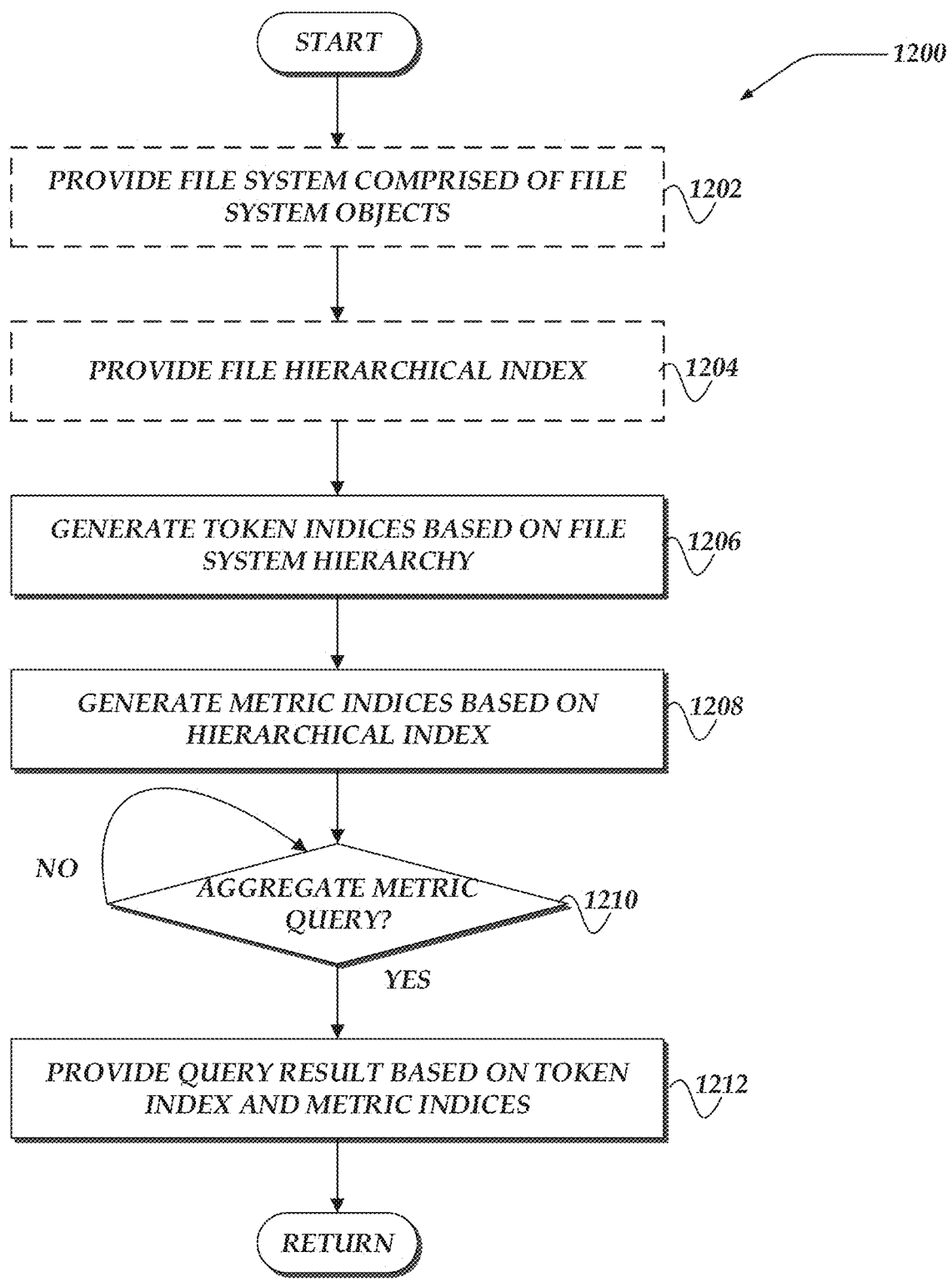
FIG. 12 illustrates an overview flowchart for a process for aggregating metrics in distributed file systems in accordance with one or more of the various embodiments.

FIG. 12 illustrates an overview flowchart for process 1200 for aggregating metrics in distributed file systems in accordance with one or more of the various embodiments. After a start block, at block 1202, in one or more of the various embodiments, optionally, a file system that comprises of a plurality of file system objects may be provided. Alternatively, in some embodiments, a portion of a file system may be provided, such as, one or more sub-trees, sub-directories, segments, shards, or the like, of a larger distributed file system.

Note, this block is marked as optional, because in some embodiments, file system engines may be provided information about a file system or a portion of a file system, such as, meta-data, index information, metric information, or the like, rather than an actual file system.

At block 1204, in one or more of the various embodiments, optionally, file system engines may be arranged to provide a hierarchical index. In one or more of the various embodiments, file system engines may be arranged to traverse the file system to generate a hierarchical index that corresponds to the provided file system.

In one or more of the various embodiments, file system engines may be arranged to associate one or more metrics with each hierarchical index record. In some embodiments, the metrics labels/names or metric values may be provided to a file system engine. Alternatively, in some embodiments, file system engines may be arranged to determine one or more metrics during while or as part of generating a hierarchical index. Accordingly, in one or more of the various embodiments, file system engines may be arranged to employ rules, instructions, grammars, or the like, provided via configuration information to determine how to determine metric values or to determine which metrics to associated with a given hierarchical index record.

Also, in one or more of the various embodiments, file system engines may be arranged to subscribe to one or more internal or external services that may provide notifications if one or more metrics associated file system objects in the file system may be modified. Likewise, in some embodiments, file system engines may be arranged to subscribe to one or more internal or external services that may provide notifications if one or more file system objects in the file system may be moved, deleted, added, updated, or the like.

Accordingly, in one or more of the various embodiments, hierarchical indices may be updated based on one or more reported changes to the file system.

This block may be considered optional because in some embodiments, hierarchical indices may be provided to file system engines rather than being generated by file system engines.

At block 1206, in one or more of the various embodiments, file system engines may be arranged to generate a token index based on the hierarchical index. In some embodiments, file system engines may be arranged to generate token indices at the same time hierarchical indices may be generated. As described above, each token index record may include information (e.g., bitmaps) that indicate each hierarchical index record that includes a given token.

In one or more of the various embodiments, file system engines may be arranged to generate an amount of token index records based on the number of unique tokens included in the paths or path information that may be included in the hierarchical index. For example, for some embodiments, if 10,000 unique tokens are includes in the file system or hierarchical index, the corresponding token index may include 10,000 records.

Note, in one or more of the various embodiments, file system engines may be arranged to adjust the number of records or bit fields to accommodate or account for implementation requirements or optimizations, such as, memory alignment, machine word-size, or the like. For example, in some embodiments, a file system engine may be arranged to generate token indices that have record bit field counts pinned to machine word-size. For example, if a word-size of 32-bits may be the optimal word size for a given machine architecture, file system engines may be arranged to generate records with bit fields lengths that align with 32-bits to match the optimal word-size. Accordingly, in some embodiments, file system engines may be arranged to employ rules, instructions, or the like, provided via configuration information to account for machine-level implementation details or optimizations.

At block 1208, in one or more of the various embodiments, file system engines may be arranged to generate one or more metric indices based on the hierarchical index. As described above, in some embodiments, file system engines may be arranged to generate a metric index for one or more individual aggregable file object metrics that may be included in the hierarchical index.

In one or more of the various embodiments, each record in a metric index may correspond to a place position for a binary (base 2) representation of the metric values. Accordingly, one or more of the various embodiments, the number of records included in a metric index for a given metric may be based on the range of values required to store a given metric. For example, if a given metric is determined to have a range of 0-1023, the corresponding metric index may include at least ten records because the maximum value a 10-bit binary number may represent is 1023. Likewise, for example, if a given metric is determined to have a maximum value of 65,535, the corresponding metric index may include at least sixteen records because 16-bits are required to represent 65,535.

Further, in one or more of the various embodiments, the length of each metric index record may be based on the number of hierarchical index records. Accordingly, in one or more of the various embodiments, each bit field position in a metric index may correspond to record in a hierarchical index.

Thus, for example, in some embodiments, if a hierarchical index has 100,000 records representing 100,000 file system objects. And, in this example, if each hierarchical index record is associated with ten 8-bit (e.g., 0-255 range) aggregable metric values (e.g., ten different metric values per file system object), a file system engine may be arranged to generate ten metric indices, each having eight records having 100,000 bit fields.

Note, in one or more of the various embodiments, file system engines may be arranged to adjust the number of records or bit fields to accommodate or account for implementation requirements or optimizations, such as, memory alignment, machine word-size, or the like. For example, in some embodiments, a file system engine may be arranged to generate metric indices that have record counts pinned to machine word-size. For example, if a word-size of 32-bits may be the optimal word size for a given machine architecture, file system engines may be arranged to generated metric indices with records counts of 32, 64, 128, and so on, to match the optimal word-size. Likewise, in some embodiments, bit fields lengths for records may be adjusted similarly to conform to machine preferences. Accordingly, in some embodiments, file system engines may be arranged to employ rules, instructions, or the like, provided via configuration information to account for machine-level implementation details or optimizations.

In some embodiments, file system engines may be arranged to omit one or more metrics from metric indices. Accordingly, in some embodiments, file system engines may be arranged to employ rules, instructions, filters, pattern matching, grammars, or the like, provided via configuration information to determine which metrics should be provided metric indices.

At decision block 1210, in one or more of the various embodiments, if an aggregate metric query may be provided, control may flow to block 1212; otherwise, file system engines may be arranged to continue normal operations. In one or more of the various embodiments, file system engines may be arranged to support one or more query providers. Accordingly, in some embodiments, query providers may be enabled to provide one or more queries that request aggregated metrics for one or more file system objects.

In one or more of the various embodiments, file system engines may be arranged to provide one or more APIs or interfaces to enable various query providers to provide one or more queries for aggregation information. Accordingly, in some embodiments, file system engines may be arranged to employ rules, instructions, filters, pattern matching, grammars, credentials, authentication/authorization information, or the like, provided via configuration information to enable query providers to provide query information.

At block 1212, in one or more of the various embodiments, file system engines may be arranged to provide a query result based on the, hierarchical index, token index and one or more metric indices. As described, query information provided by one or more query provider may be parsed to determine if the query may be associated one or more aggregable metrics. Accordingly, in some embodiments, file system engines may be arranged to determine the appropriate metric indices to generate one or more partial sums based on the metric index place position information and the count information determined from the token index records. Thus, in some embodiments, the partial sums may be combined and returned to query providers as query results.

Next, control may be returned to a calling process.

Figure 13:
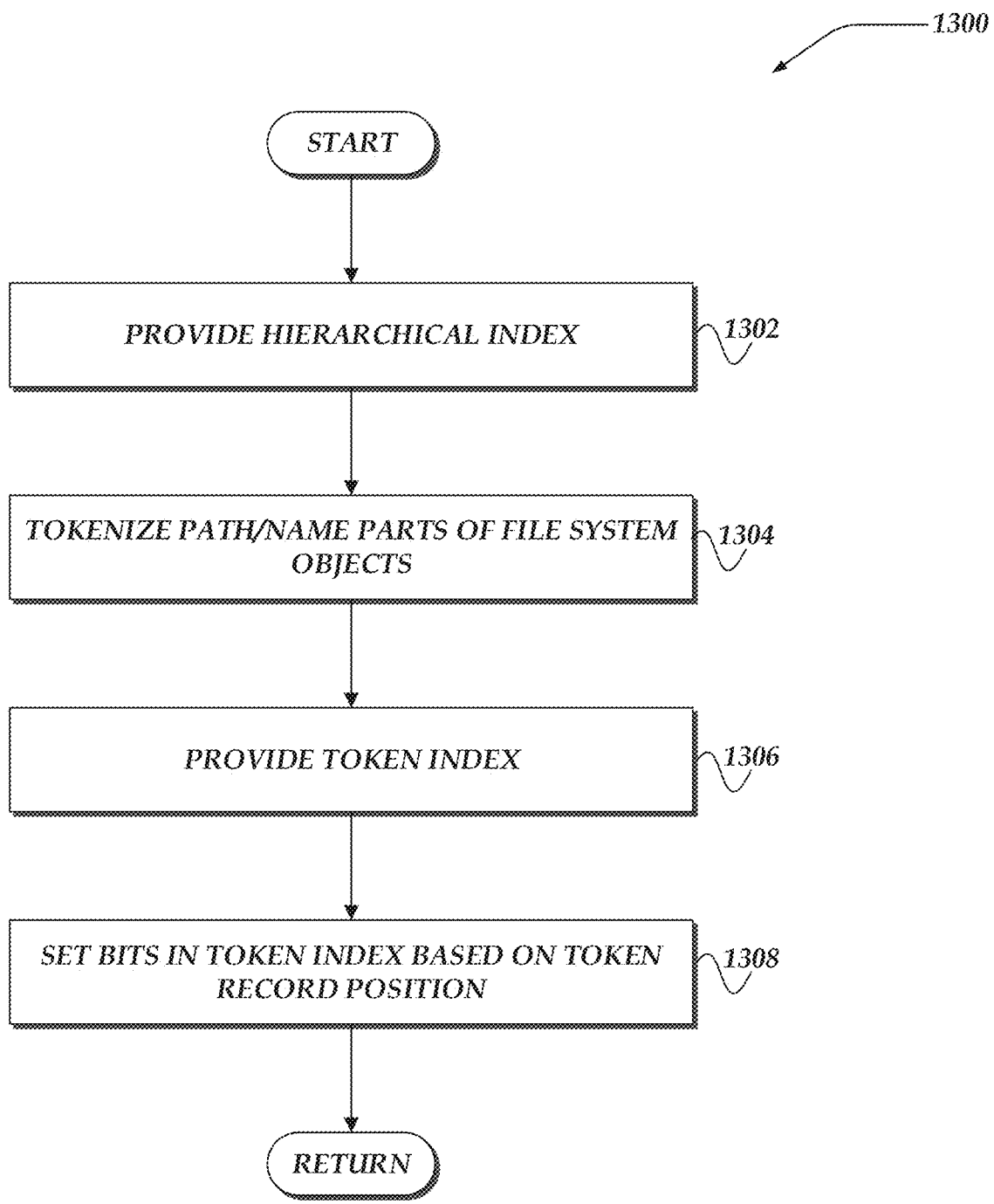
FIG. 13 illustrates a flowchart for a process for aggregating metrics in distributed file systems in accordance with one or more of the various embodiments.

FIG. 13 illustrates a flowchart for process 1300 for aggregating metrics in distributed file systems in accordance with one or more of the various embodiments. After a start block, at block 1302, in one or more of the various embodiments, a hierarchical index may be provided. As described above, hierarchical indices may be data structures that sort and organization file system objects based on a layout or organization of a file system. In one or more of the various embodiments, each file system objects in the file system (or a portion of a file system) may be associated with one record in a hierarchical index. In some embodiments, for large file systems, the physical representation of a hierarchical index include two or more part or portions spread across different storage resources. However, in some embodiments, logically hierarchical indices may be considered to include an entire file system (or portion of a file system) in a single record set or data structure such that each record in the hierarchical index corresponds a file system object.

At block 1304, in one or more of the various embodiments, file system engines may be arranged to tokenize the path or name parts of the file system objects included in the hierarchical index. As described above, in some embodiments, file system engines may be arranged to generate a token index that may be an inverted index based on the using individual parts of a file system objects path or name as tokens.

At block 1306, in one or more of the various embodiments, file system engines may be arranged to provide a token index based on tokenized path or name parts of file system objects that may be included in the hierarchical.

As described above, token indices may be comprised of records that correspond to each unique token included in file system objects paths. In some embodiments, each record may include a bitmap that indicate each record in the hierarchical index that includes a given token.

Accordingly, in one or more of the various embodiments, file system engines may be arranged to generate bitmaps that have a bit-length/bit-count based on the number of file system objects represented in the hierarchical index. For example, if the hierarchical index includes 500,000 file system objects, each record in a corresponding token index may be a bitmap having 500,000 bit fields.

At block 1308, in one or more of the various embodiments, file system engines may be arranged to set the bits in the token index based on token record position information.

Accordingly, in one or more of the various embodiments, a bit field in a token record may be set if the token may be found in the hierarchical index record that corresponds to that bit field. For example, if a token is included in every file system object path (e.g., a root directory token) each bit field in the corresponding token index record may be set. Likewise, for example, if a token is found in the 10th, 12th, and 13th hierarchical index record, bit fields corresponding to those records may be set in the corresponding token index record.

Next, in one or more of the various embodiments, control may be returned to a calling process.

Figure 14:
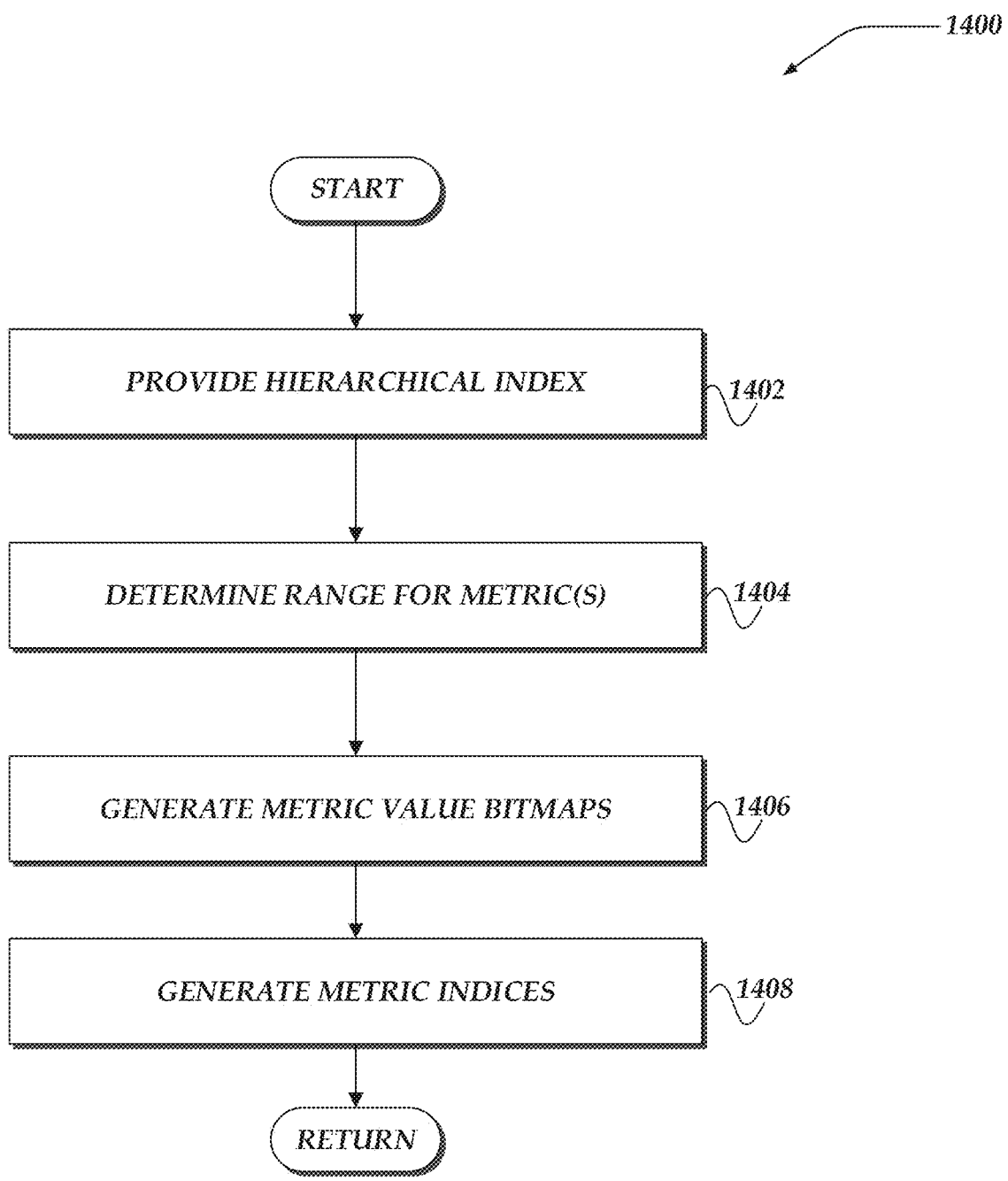
FIG. 14 illustrates a flowchart for a process for aggregating metrics in distributed file systems in accordance with one or more of the various embodiments.

FIG. 14 illustrates a flowchart for process 1400 for aggregating metrics in distributed file systems in accordance with one or more of the various embodiments. In some embodiments, process 1400 may be arranged to generated metric indices as disclosed by FIG. 8 and its accompanying description. After a start block, at block 1402, in one or more of the various embodiments, a hierarchical index may be provided as described above.

At block 1404, in one or more of the various embodiments, file system engines may be arranged to determine the range or maximum value for one or more metric values that may be associated with file system objects included in the hierarchical index. In one or more of the various embodiments, the number of rows required in a metric index may be based on the range of values that need to be represented in a given metric index. In some embodiments, each row of a metric index may be a place position for a base-2 (binary) number. For example, if the maximum value of a metric may be 1023, its associated metric index may require at least ten columns.

At block 1406, in one or more of the various embodiments, file system engines may be arranged to generate one or more metric value bitmaps based on one or more of the metrics values includes in the hierarchical index. In some embodiments, bitmaps may be represented using a variety of data structures, include contiguous memory, sparse arrays, sparse vectors, or the like.

At block 1408, in one or more of the various embodiments, file system engines may be arranged to generate one or more metric indices based on the one or more generated metric value bitmaps. In one or more of the various embodiments, as described above, each logical row of a metric index may correspond to value place position such that each column of a metric index may (column-wise) represent a value of the metric associated with record in the token index.

Next, in one or more of the various embodiments, control may be returned to a calling process.

Figure 15:
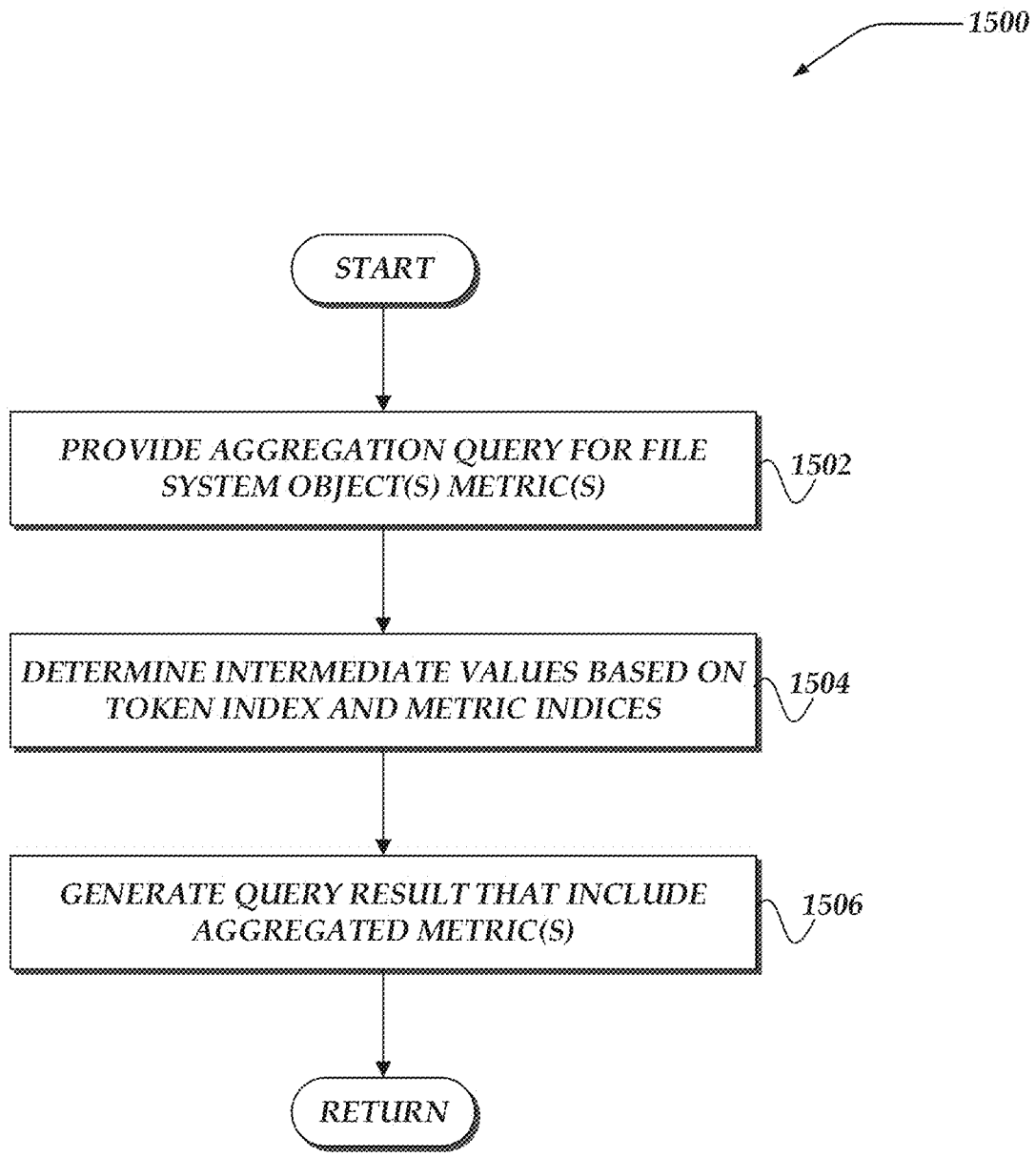
FIG. 15 illustrates a flowchart for a process for generating query results for aggregating metrics in distributed file systems in accordance with one or more of the various embodiments.

FIG. 15 illustrates a flowchart for process 1500 for generating query results for aggregating metrics in distributed file systems in accordance with one or more of the various embodiments. After a start block, at block 1502, in one or more of the various embodiments, one or more aggregation queries may be provided to a file system engine. In some embodiments, queries that request on metric aggregations may be provided from various sources, including, remote or local command-line clients, remote or location applications, services, or the like. Accordingly, in one or more of the various embodiments, file system engines may be arranged to support one or more conventional or custom communication protocols that enable queries to be provided to a file system engines. In some embodiments, queries may be provided as structured data (e.g., json, XML-RPC, or the like), strings, or the like. For example, in some embodiments, file system engines may be arranged to provide a HTTP/REST API that enables users to provide query information. Accordingly, in one or more of the various embodiments, file system engines may be arranged to employ rules, instructions, grammars, or the like, provided via configuration information to determine how to interpret various query information.

At block 1504, in one or more of the various embodiments, file system engines may be arranged to determine one or more intermediate values based on token indices and metrics indices. As described, in some embodiments, file system engines may determine a hierarchical index, token index, or one or more metric indices that may be relevant to the provided query information. For example, in some embodiments, if the query information request the a file system object size metrics should be aggregated, a metric index associated with file system object size may be determined and provided.

In some embodiments, if the relevant metric index may be unavailable, file system engines may be arranged to generate the necessary metric indices on demand.

At block 1506, in one or more of the various embodiments, file system engines may be arranged to generate one or more query results that include one or more aggregated metrics. As described above, file system engines may be arranged to computed request aggregation results based on a hierarchical index, token index, and one or more metric indices.

In one or more of the various embodiments, the result may be communicated back to the query provider using one or more conventional or custom protocols or formats that may be compatible with the query provider. Accordingly, in one or more of the various embodiments, file system engines may be arranged to employ rules, instructions, grammars, or the like, provided via configuration information to determine how to format and communicate query results to various query providers.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

The invention claimed is:

1. A method for managing file systems over a network using a network computer that performs actions, comprising:
    providing a hierarchical index based on a file system and a plurality of objects stored in the file system, wherein the plurality of objects are sorted based on a compound key that includes file-tree depth and a path;
    generating a token index based on the hierarchical index, wherein the token index includes one or more records and one or more tokens, and wherein each token is a portion of the path of the one or more objects, and wherein each record is associated with a bitmap that includes a number of bit fields based on an amount of the plurality of objects;
    generating one or more metric indices based on the hierarchical index and a plurality of metrics associated with the one or more objects, wherein the one or more metrics indices include one or more rows, and wherein each row of the one or more metric indices corresponds to a place position for a metric value; and
    in response to one or more queries, employing the token index and the one or more metric indices to generate one or more query results, wherein the one or more query results are based on the plurality of metrics associated with the one or more objects.

2. The method of claim 1, wherein generating the token index further comprises, setting one or more bit fields in the bitmap for each token based on a position of each record in the hierarchical index that includes the token, wherein setting a bit field indicates that the token is included in a corresponding record in the hierarchical index.

3. The method of claim 1, wherein providing the hierarchical index, further comprises:
    determining a value for each of the plurality of metrics that correspond to an object; and
    associating the value for each of the plurality of metrics with a record in the hierarchical index that corresponds to the object.

4. The method of claim 1, wherein generating the one or more metric indices, further comprises:
    associating each column of the one or more metric indices with a record in the hierarchical index; and
    generating a separate metric index for each metric.

5. The method of claim 1, wherein generating the one or more query results, further comprises:
    determining one or more query objects and one or more query metrics based on the one or more queries;
    determining one or more query metric indices based on the one or more query metrics, wherein one or more query place position bitmaps are determined from the one or more query metric indices;
    employing the token index to provide one or more location bitmaps that correspond to the one or more query objects and the one or more query metrics;
    generating one or more intermediate result bitmaps based on bit-wise products of the one or more query place position bitmaps and the one or more location bitmaps;
    generating one or more intermediate result values based on each intermediate result bitmap; and
    generating the one or more query results based on a sum of the one or more intermediate result values.

6. A system for managing file systems over a network, comprising:
    one or more network computers, comprising:
    a transceiver that communicates over the network;
    a memory that is arranged to store at least instructions; and
    one or more processor devices that execute instructions that perform actions, including:
        providing a hierarchical index based on a file system and a plurality of objects stored in the file system, wherein the plurality of objects are sorted based on a compound key that includes file-tree depth and a path;
        generating a token index based on the hierarchical index, wherein the token index includes one or more records and one or more tokens, and wherein each token is a portion of the path of the one or more objects, and wherein each record is associated with a bitmap that includes a number of bit fields based on an amount of the plurality of objects;

generating one or more metric indices based on the hierarchical index and a plurality of metrics associated with the one or more objects, wherein the one or more metrics indices include one or more rows, and wherein each row of the one or more metric indices corresponds to a place position for a metric value; and in response to one or more queries, employing the token index and the one or more metric indices to generate one or more query results, wherein the one or more query results are based on the plurality of metrics associated with the one or more objects; and one or more client computers, comprising:
a transceiver that communicates over the network;
a memory that is arranged to store at least instructions; and
one or more processor devices that execute instructions that perform actions, including:
providing the one or more queries.

7. The system of claim 6, wherein generating the token index further comprises, setting one or more bit fields in the bitmap for each token based on a position of each record in the hierarchical index that includes the token, wherein setting a bit field indicates that the token is included in a corresponding record in the hierarchical index.

8. The system of claim 6, wherein providing the hierarchical index, further comprises:
determining a value for each of the plurality of metrics that correspond to an object; and
associating the value for each of the plurality of metrics with a record in the hierarchical index that corresponds to the object.

9. The system of claim 6, wherein generating the one or more metric indices, further comprises:
associating each column of the one or more metric indices with a record in the hierarchical index; and
generating a separate metric index for each metric.

10. The system of claim 6, wherein generating the one or more query results, further comprises;
determining one or more query objects and one or more query metrics based on the one or more queries;
determining one or more query metric indices based on the one or more query metrics, wherein one or more query place position bitmaps are determined from the one or more query metric indices;
employing the token index to provide one or more location bitmaps that correspond to the one or more query objects and the one or more query metrics;
generating one or more intermediate result bitmaps based on bit-wise products of the one or more query place position bitmaps and the one or more location bitmaps;
generating one or more intermediate result values based on each intermediate result bitmap; and
generating the one or more query results based on a sum of the one or more intermediate result values.

11. A processor readable non-transitory storage media that includes instructions for managing file systems over a network, wherein execution of the instructions by one or more processor devices performs actions, comprising:
providing a hierarchical index based on a file system and a plurality of objects stored in the file system, wherein the plurality of objects are sorted based on a compound key that includes file-tree depth and a path;
generating a token index based on the hierarchical index, wherein the token index includes one or more records and one or more tokens, and wherein each token is a portion of the path of the one or more objects, and wherein each record is associated with a bitmap that includes a number of bit fields based on an amount of the plurality of objects;
generating one or more metric indices based on the hierarchical index and a plurality of metrics associated with the one or more objects, wherein the one or more metrics indices include one or more rows, and wherein each row of the one or more metric indices corresponds to a place position for a metric value; and
in response to one or more queries, employing the token index and the one or more metric indices to generate one or more query results, wherein the one or more query results are based on the plurality of metrics associated with the one or more objects.

12. The media of claim 11, wherein generating the token index further comprises, setting one or more bit fields in the bitmap for each token based on a position of each record in the hierarchical index that includes the token, wherein setting a bit field indicates that the token is included in a corresponding record in the hierarchical index.

13. The media of claim 11, wherein providing the hierarchical index, further comprises:
determining a value for each of the plurality of metrics that correspond to an object; and
associating the value for each of the plurality of metrics with a record in the hierarchical index that corresponds to the object.

14. The media of claim 11, wherein generating the one or more metric indices, further comprises:
associating each column of the one or more metric indices with a record in the hierarchical index; and
generating a separate metric index for each metric.

15. The media of claim 11, wherein generating the one or more query results, further comprises:
determining one or more query objects and one or more query metrics based on the one or more queries;
determining one or more query metric indices based on the one or more query metrics, wherein one or more query place position bitmaps are determined from the one or more query metric indices;
employing the token index to provide one or more location bitmaps that correspond to the one or more query objects and the one or more query metrics;
generating one or more intermediate result bitmaps based on bit-wise products of the one or more query place position bitmaps and the one or more location bitmaps;
generating one or more intermediate result values based on each intermediate result bitmap; and
generating the one or more query results based on a sum of the one or more intermediate result values.

16. A network computer for managing file systems over a network comprising:
a transceiver that communicates over the network;
a memory that is arranged to store at least instructions; and
one or more processor devices that execute instructions that perform actions, including:
providing a hierarchical index based on a file system and a plurality of objects stored in the file system, wherein the plurality of objects are sorted based on a compound key that includes file-tree depth and a path;
generating a token index based on the hierarchical index, wherein the token index includes one or more records and one or more tokens, and wherein each token is a portion of the path of the one or more objects, and wherein each record is associated with a bitmap that includes a number of bit fields based on an amount of the plurality of objects;

generating one or more metric indices based on the hierarchical index and a plurality of metrics associated with the one or more objects, wherein the one or more metrics indices include one or more rows, and wherein each row of the one or more metric indices corresponds to a place position for a metric value; and in response to one or more queries, employing the token index and the one or more metric indices to generate one or more query results, wherein the one or more query results are based on the plurality of metrics associated with the one or more objects.

17. The network computer of claim 16, wherein generating the token index further comprises, setting one or more bit fields in the bitmap for each token based on a position of each record in the hierarchical index that includes the token, wherein setting a bit field indicates that the token is included in a corresponding record in the hierarchical index.

18. The network computer of claim 16, wherein providing the hierarchical index, further comprises:

determining a value for each of the plurality of metrics that correspond to an object; and associating the value for each of the plurality of metrics with a record in the hierarchical index that corresponds to the object.

19. The network computer of claim 16, wherein generating the one or more metric indices, further comprises:

associating each column of the one or more metric indices with a record in the hierarchical index; and generating a separate metric index for each metric.

20. The network computer of claim 16, wherein generating the one or more query results, further comprises:

determining one or more query objects and one or more query metrics based on the one or more queries;

determining one or more query metric indices based on the one or more query metrics, wherein one or more query place position bitmaps are determined from the one or more query metric indices;

employing the token index to provide one or more location bitmaps that correspond to the one or more query objects and the one or more query metrics;

generating one or more intermediate result bitmaps based on bit-wise products of the one or more query place position bitmaps and the one or more location bitmaps;

generating one or more intermediate result values based on each intermediate result bitmap; and generating the one or more query results based on a sum of the one or more intermediate result values.

* * * * *